US012739161B2

(12) United States Patent
Muralidhar et al.

(10) Patent No.: US 12,739,161 B2
(45) Date of Patent: Sep. 15, 2026

(54) METHOD AND APPARATUS FOR ALLOCATING SOUNDING REFERENCE SIGNAL RESOURCE IN WIRELESS COMMUNICATION SYSTEM

(71) Applicant: Samsung Electronics Co., Ltd., Gyeonggi-do (KR)

(72) Inventors: Karthik Muralidhar, Bangalore (IN); Youngrok Jang, Gyeonggi-do (KR); Diwakar Sharma, Bangalore (IN); Santanu Mondal, Bangalore (IN); Dattaraj Dileep Raut Mulgaonkar, Bangalore (IN); Satya Kumar Vankayala, Bangalore (IN)

(73) Assignee: Samsung Electronics Co., Ltd (KR)

( * ) Notice: Subject to any disclaimer, the term of this patent is extended or adjusted under 35 U.S.C. 154(b) by 323 days.

(21) Appl. No.: 18/366,919

(22) Filed: Aug. 8, 2023

(65) Prior Publication Data

US 2024/0056340 A1 Feb. 15, 2024

(30) Foreign Application Priority Data

Aug. 8, 2022 (IN) ............................ 202241045174
Nov. 4, 2022 (IN) ............................ 202241063205
Jul. 10, 2023 (IN) ............................ 202341046351
Jul. 19, 2023 (IN) ............................ 202241045174

(51) Int. Cl.
*H04L 27/26* (2006.01)
*H04L 5/00* (2006.01)

(52) U.S. Cl.
CPC ........ *H04L 27/2613* (2013.01); *H04L 5/0051* (2013.01); *H04L 27/2605* (2013.01)

(58) Field of Classification Search
None
See application file for complete search history.

(56) References Cited

U.S. PATENT DOCUMENTS

2011/0098054 A1* 4/2011 Gorokhov .............. H04B 7/024 455/422.1
2015/0038135 A1* 2/2015 Lu ......................... H04L 5/0073 455/552.1
2015/0312009 A1 10/2015 Nissila et al.
(Continued)

OTHER PUBLICATIONS

Xiaomi, "Discussion on SRS Enhancements", R1-2203797, 3GPP TSG RAN WG1 #109-e, May 9-20, 2022, 5 pages.
(Continued)

*Primary Examiner* — Diane L Lo
(74) *Attorney, Agent, or Firm* — The Farrell Law Firm, P.C.

(57) ABSTRACT

The disclosure relates to a 5G or 6G communication system for supporting a higher data transmission rate. A method is provided for handling SRS resource allocation in multi-TRP in wireless networks by a BS or a TRP unit. The method includes configuring CS allocation to at least one port of a UE. The CS allocation uses values from a sub-set of a plurality of allowable CS values. Further, the method includes receiving a SRS using the allocated CS. In an embodiment, per-port CS allocation provides flexibility of using the CS resources efficiently to minimize inter-TRP interference. The method can be used to allocate CS and SRS resources efficiently.

8 Claims, 45 Drawing Sheets

(56) References Cited

U.S. PATENT DOCUMENTS

| | | | | |
|---|---|---|---|---|
| 2020/0014507 | A1* | 1/2020 | Joseph | H04L 5/0091 |
| 2020/0059338 | A1* | 2/2020 | Joseph | H04W 72/1273 |
| 2020/0313815 | A1* | 10/2020 | Sridharan | H04B 7/0404 |
| 2023/0155765 | A1* | 5/2023 | Zhang | H04L 5/0012 370/329 |
| 2023/0239843 | A1* | 7/2023 | Liu | H04L 5/0096 370/329 |

OTHER PUBLICATIONS

Vivo, "Views on SRS Enhancement", R1-2203545, 3GPP TSG RAN WG1 #109-e, May 9-20, 2022, 5 pages.

Qualcomm Incorporated, SRS Enhancement for TDD CJT and 8TX Operation, R1-2205018, 3GPP TSG RAN WG1 #109-e, May 9-20, 2022, 7 pages.

Futurewei, "SRS Enhancements for TDD CJT and 8TX Operation", R1-2203066, 3GPP TSG RAN WG1 Meeting #109-e, May 9-20, 2022, 12 pages.

International Search Report dated Nov. 20, 2023 issued in counterpart application No. PCT/KR2023/011708, 6 pages.

Xiaolin Hou et al., "DMRS Design and Channel Estimation for LTE-Advanced MIMO Uplink", Conference Paper in Vehicular Technology Conference, 1988, IEEE 38th, Sep. 2009, pp. 6.

"Discrete prolate spheroidal (Slepian) sequences", © 1994-2023 the MathWorks, Inc., https://www.mathworks.com/help/signal/ref/dpss.html, pp. 5.

* cited by examiner

S = -2, b = 2

S=0, b=2

S=0, b=1

In this depiction there are a maximum of 12 CSs, cmax= 12 CSs from 0-11

Colored boxes belong to one subset

M=3, Nap=2

METHOD AND APPARATUS FOR ALLOCATING SOUNDING REFERENCE SIGNAL RESOURCE IN WIRELESS COMMUNICATION SYSTEM

CROSS REFERENCE TO RELATED APPLICATION

This application is based on and claims the benefit of Indian Provisional Application Nos. 202241045174, 202241063205, and 202341046351, which were filed in the Indian Patent Office on Aug. 8, 2022, Nov. 4, 2022, and Jul. 10, 2023, respectively, and to Indian Complete Application No. 202241045174, which was filed in the Indian Patent Office on Jul. 19, 2023, the entire content of each of which is incorporated herein by reference.

BACKGROUND

1. Field

The disclosure relates generally to wireless networks, and more particularly, to methods for handling sounding reference signal (SRS) resource allocation in a multi-transmission/reception point (TRP) in the wireless networks.

2. Description of the Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz (THz) bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

SUMMARY

The disclosure has been made to address the above-mentioned problems and disadvantages, and to provide at least the advantages described below.

Accordingly, an aspect of the disclosure is to provide methods and devices for managing SRS cyclic shift (CS) resource allocation in a wireless network.

Another aspect of the disclosure is to provide methods for handling SRS resource allocation in multi-TRP in wireless networks.

Another aspect of the disclosure is to provide methods for resource assignment, like allocating CS, comb size, maximum CS and other SRS resources in the wireless networks that is configurable on a per port basis via a radio resource control (RRC) messages.

Another aspect of the disclosure is to provide a receiver for handling SRS resource allocation in multi-TRP in the wireless networks and also single-TRP in wireless networks.

Another aspect of the disclosure is to provide an improved orthogonal time frequency space (OTFS) transmitter and receiver used in the wireless network.

In accordance with an aspect of the disclosure, a method performed by a BS in a wireless network includes transmitting, to a UE, configuration information of a resource allocation to at least one port of the UE; and receiving, from the UE, an SRS based on the configuration information of the resource allocation, The resource allocation includes at least one of a CS allocation or a comb shift allocation, and the resource allocation is based on values from one or more sub-sets of a set of allowable CS values or allowable comb shift values.

In accordance with another aspect of the disclosure, a method performed by a UE in a wireless network includes receiving, from a BS, configuration information of a resource allocation to at least one port of the UE; and transmitting, to the BS, an SRS based on the configuration information of the resource allocation. The resource allocation includes at least one of a CS allocation or a comb shift allocation, and the resource allocation is based on values from one or more sub-sets of a set of allowable CS values or allowable comb shift values.

In accordance with another aspect of the disclosure, a BS in a wireless communication system includes a transceiver; and a processor coupled with the transceiver and configured to transmit, to a UE, configuration information of a resource allocation to at least one port of the UE, and receive, from the UE, an SRS based on the configuration information of the resource allocation. The resource allocation includes at least one of a cyclic shift (CS) allocation or a comb shift allocation, and the resource allocation is based on values from one or more sub-sets of a set of allowable CS values or allowable comb shift values.

In accordance with another aspect of the disclosure, a UE in a wireless communication system includes a transceiver; and a processor coupled with the transceiver and configured to receive, from a BS, configuration information of a resource allocation to at least one port of the UE, and transmit, to the BS, an SRS based on the configuration information of the resource allocation. The resource allocation includes at least one of a CS allocation or a comb shift allocation, and the resource allocation is based on values from one or more subsets of a set of allowable CS values or allowable comb shift values.

BRIEF DESCRIPTION OF FIGURES

The above and other aspects, features, and advantages of certain embodiments of the disclosure will be more apparent from the following description taken in conjunction with the accompanying drawings, in which.

Figure 3:
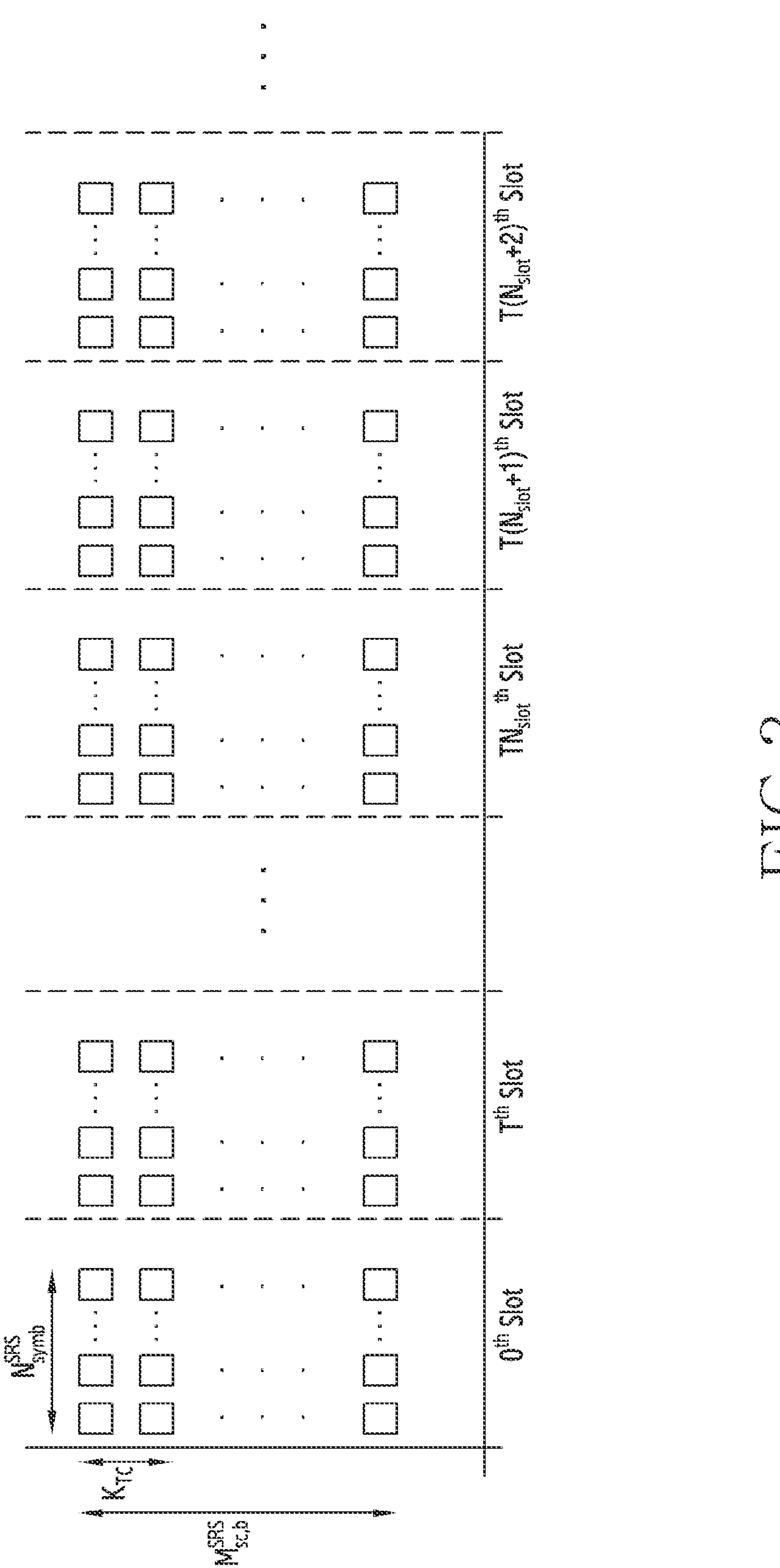
Figure 4:
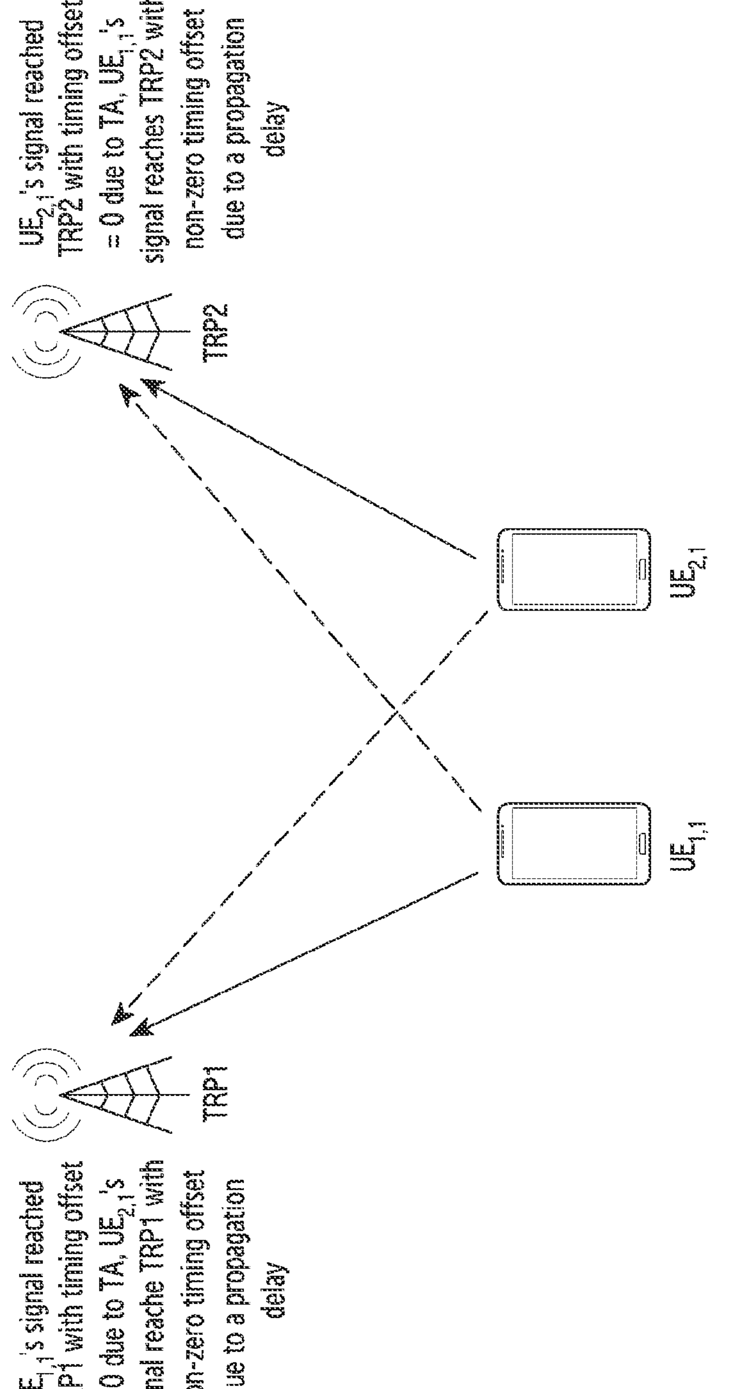
Figure 5:
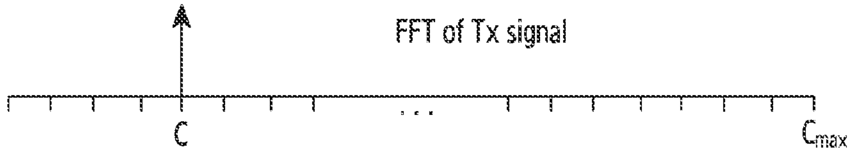
Figure 5:
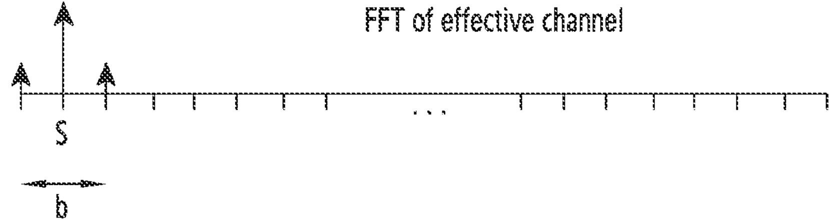
Figure 5:
Figure 6:
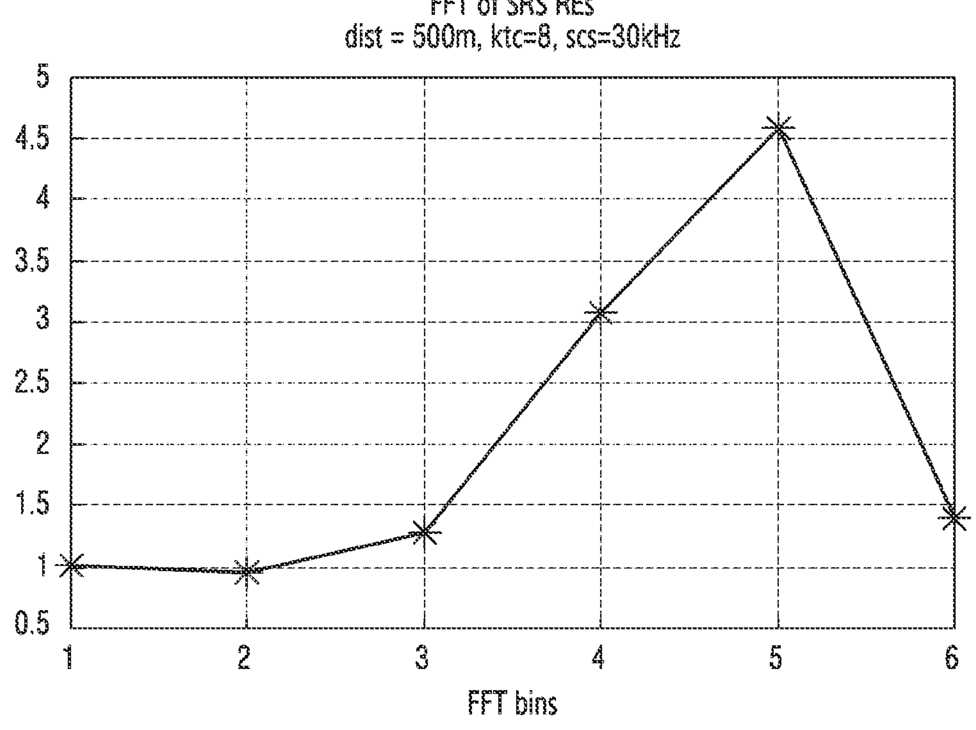
Figure 7:
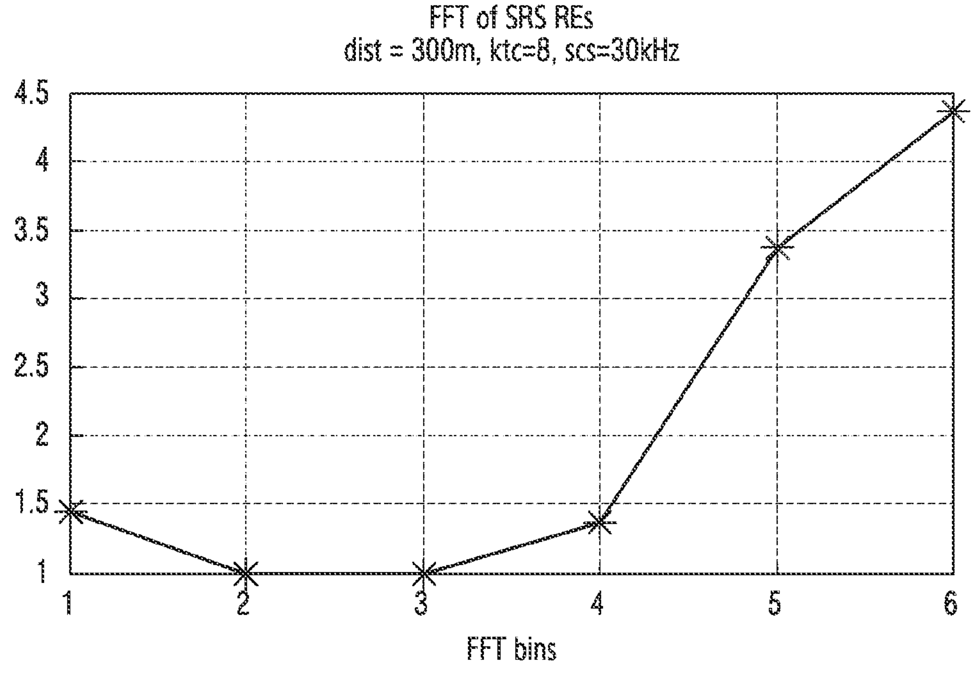
Figure 8:
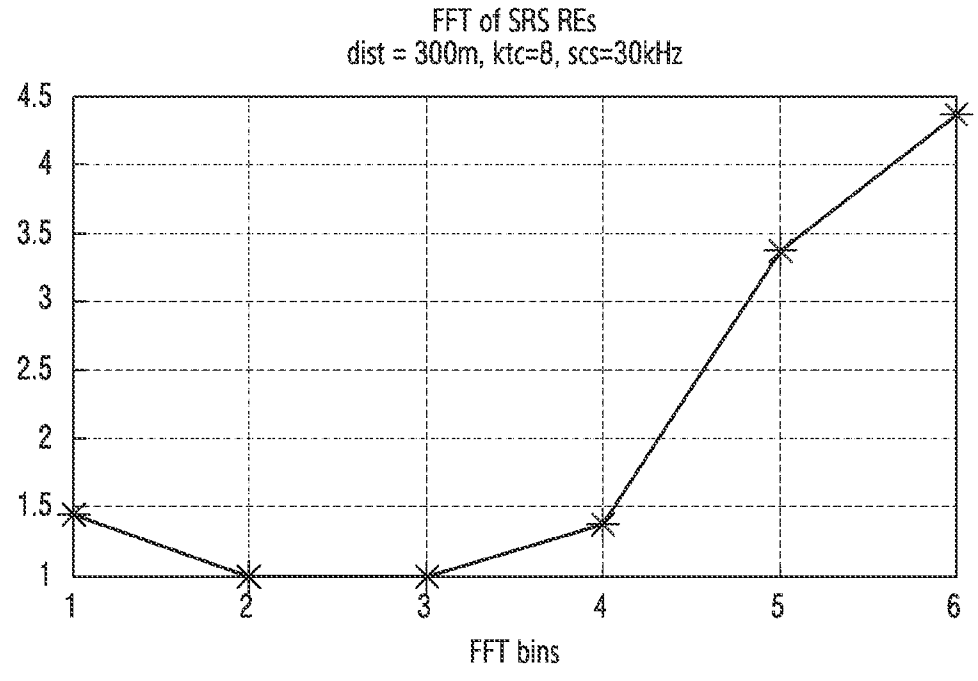
Figure 9:
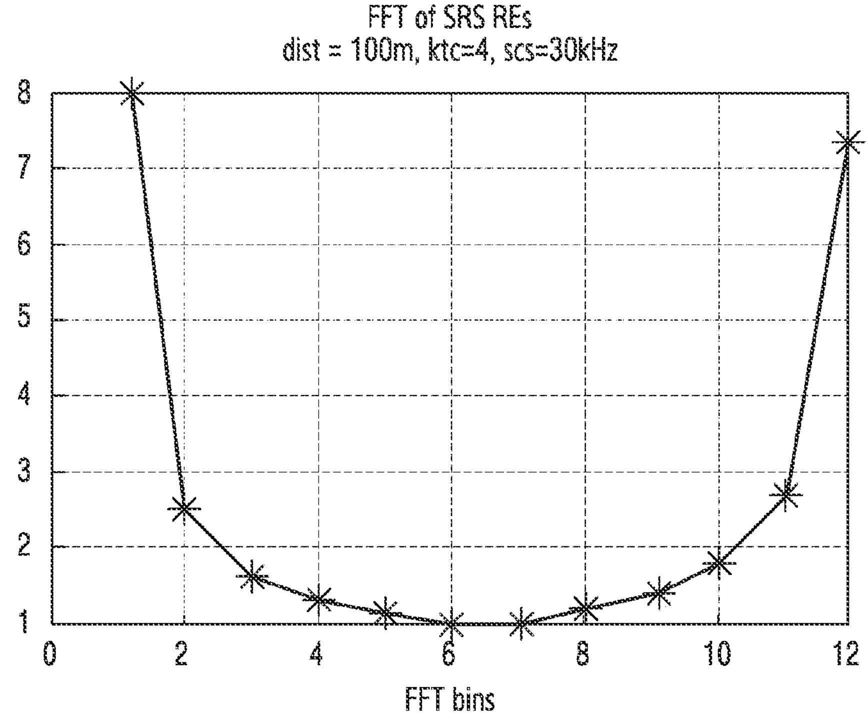
Figure 10:
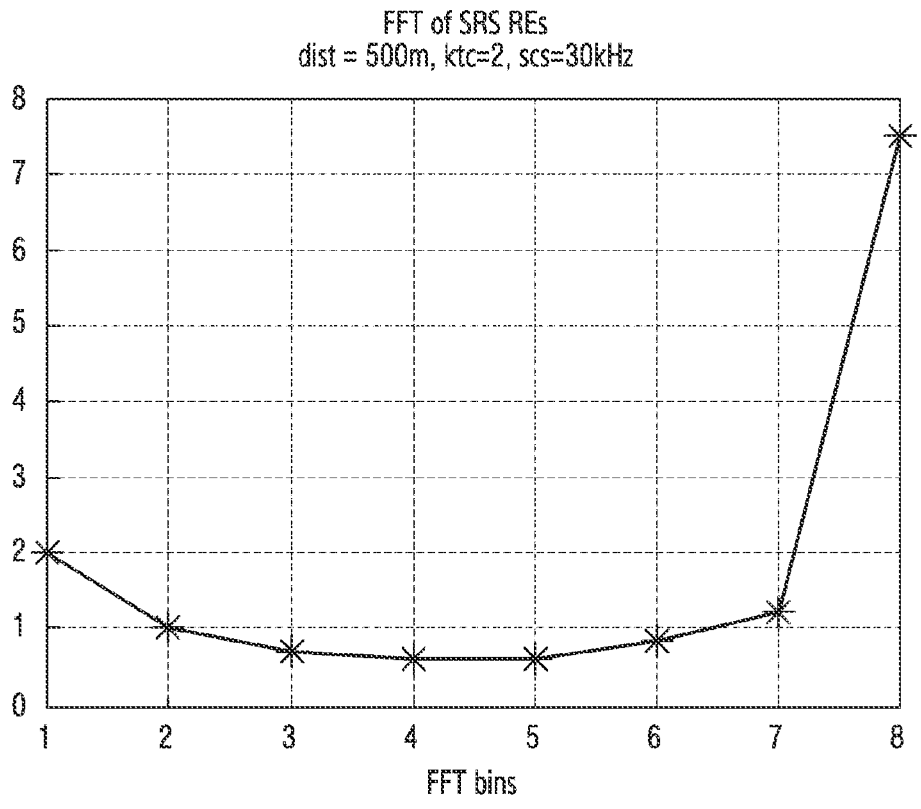
Figure 11:
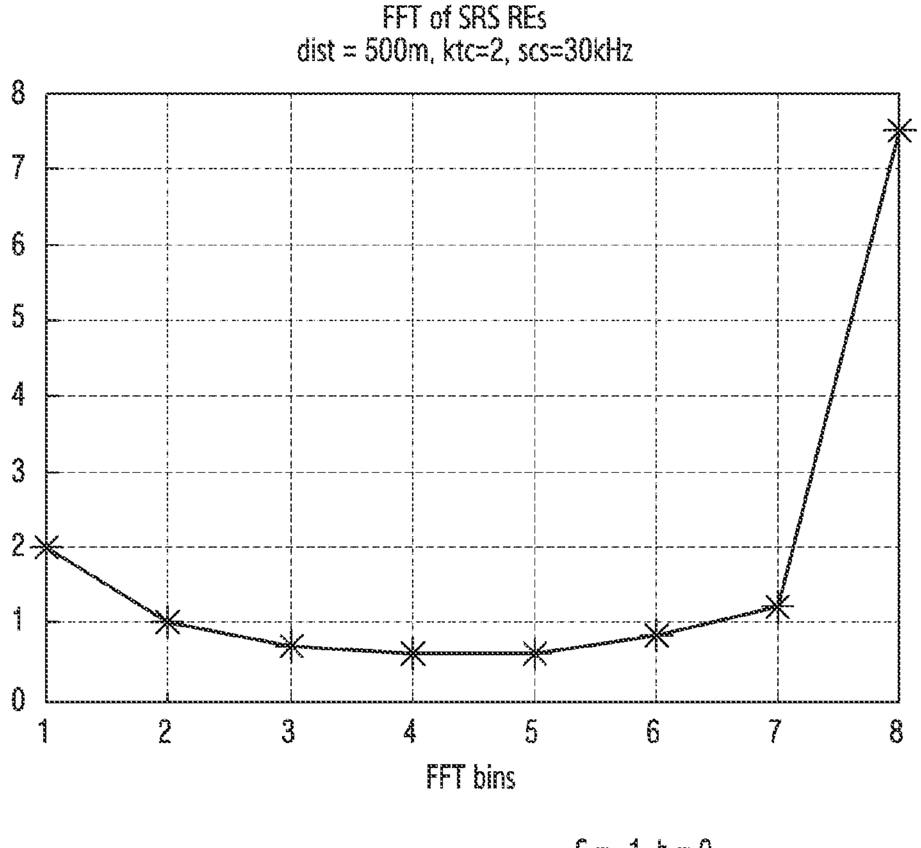
Figure 12:
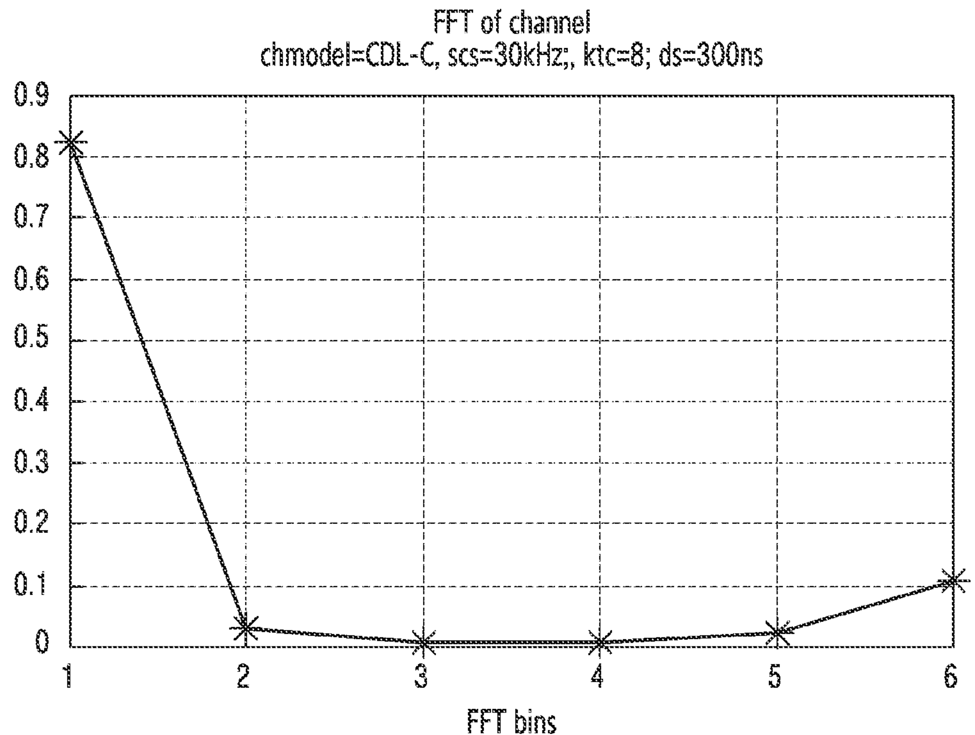
Figure 13:
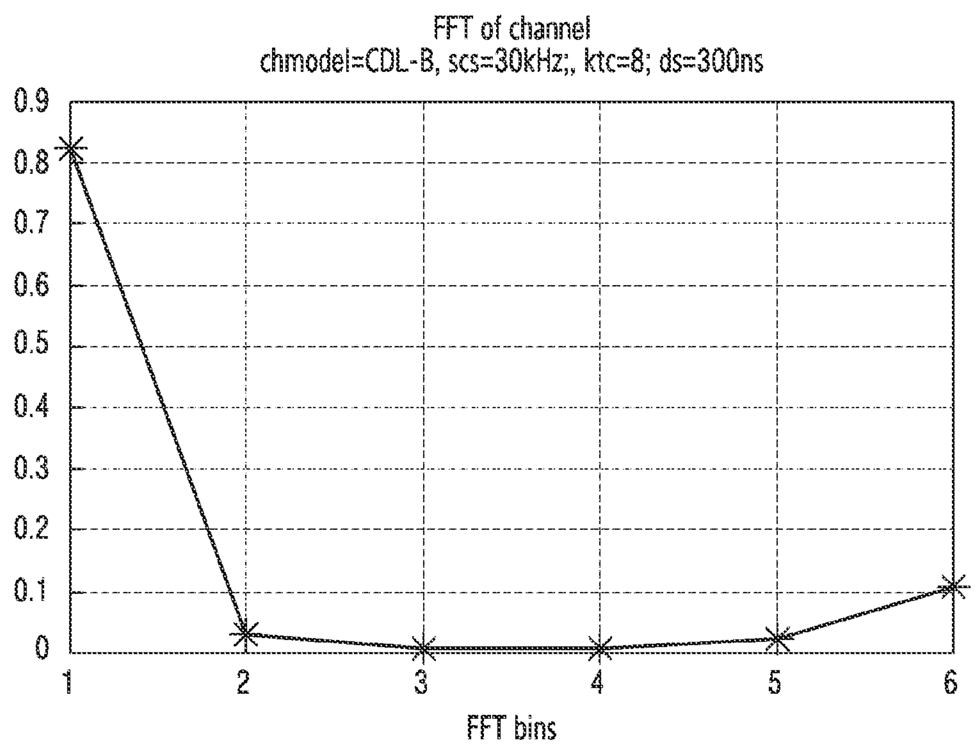
Figure 14:
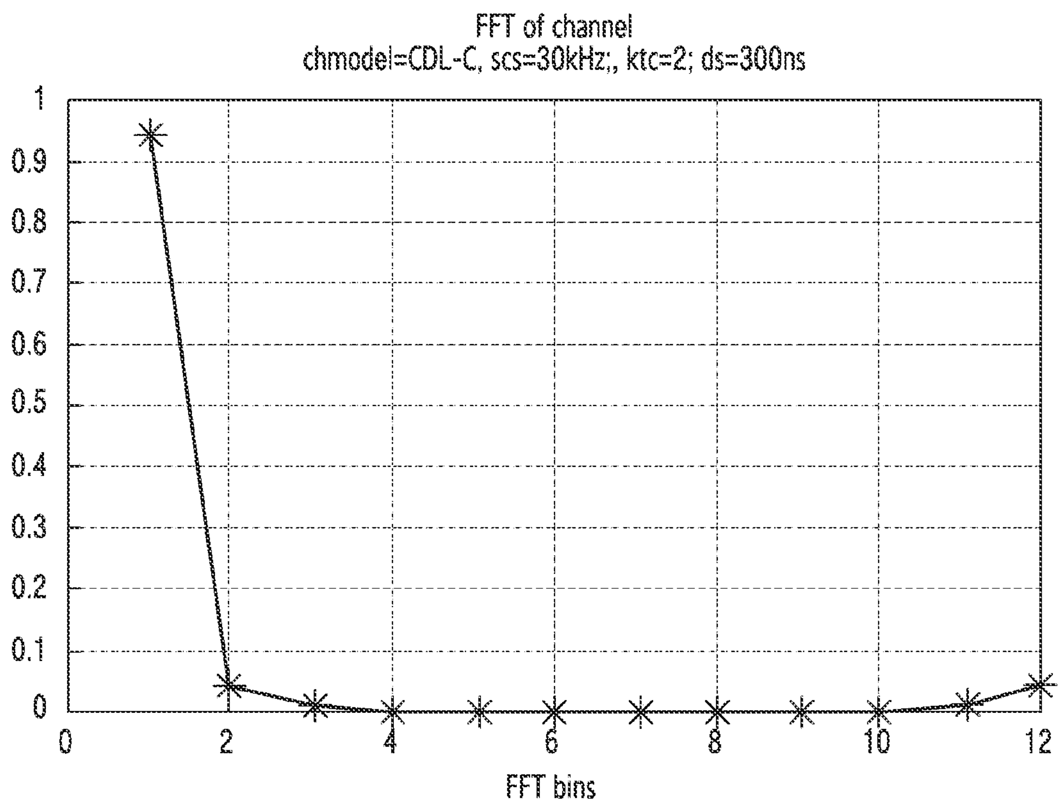
Figure 15:
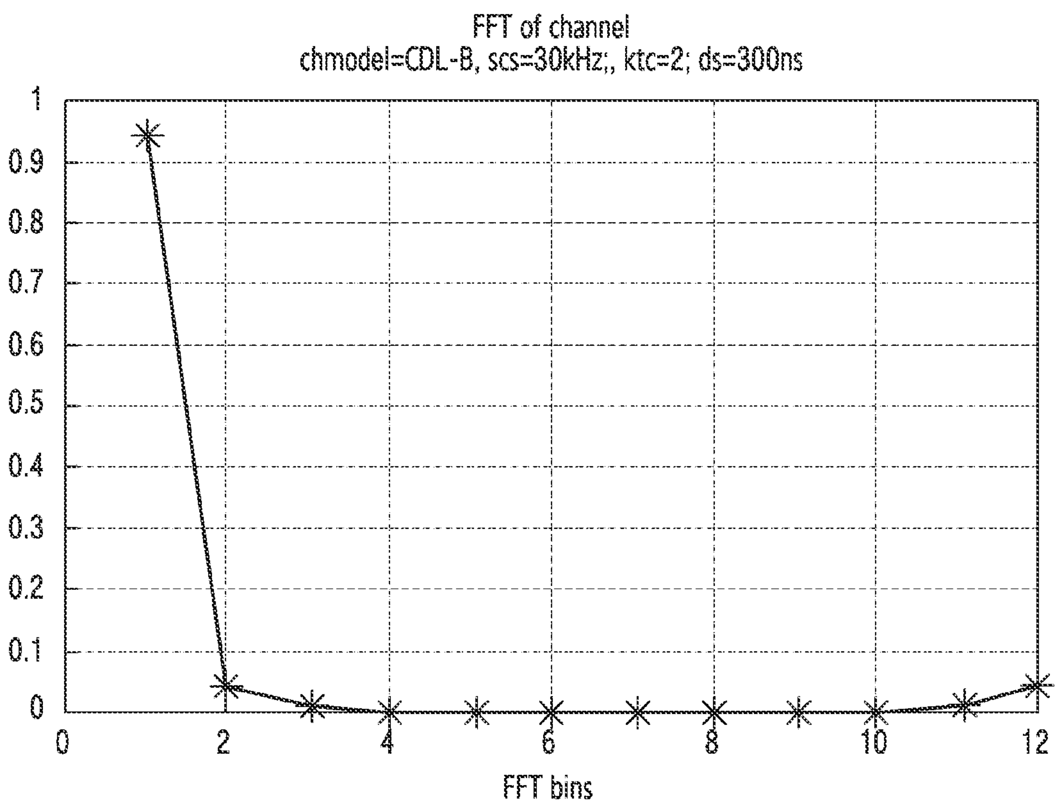
Figure 16:
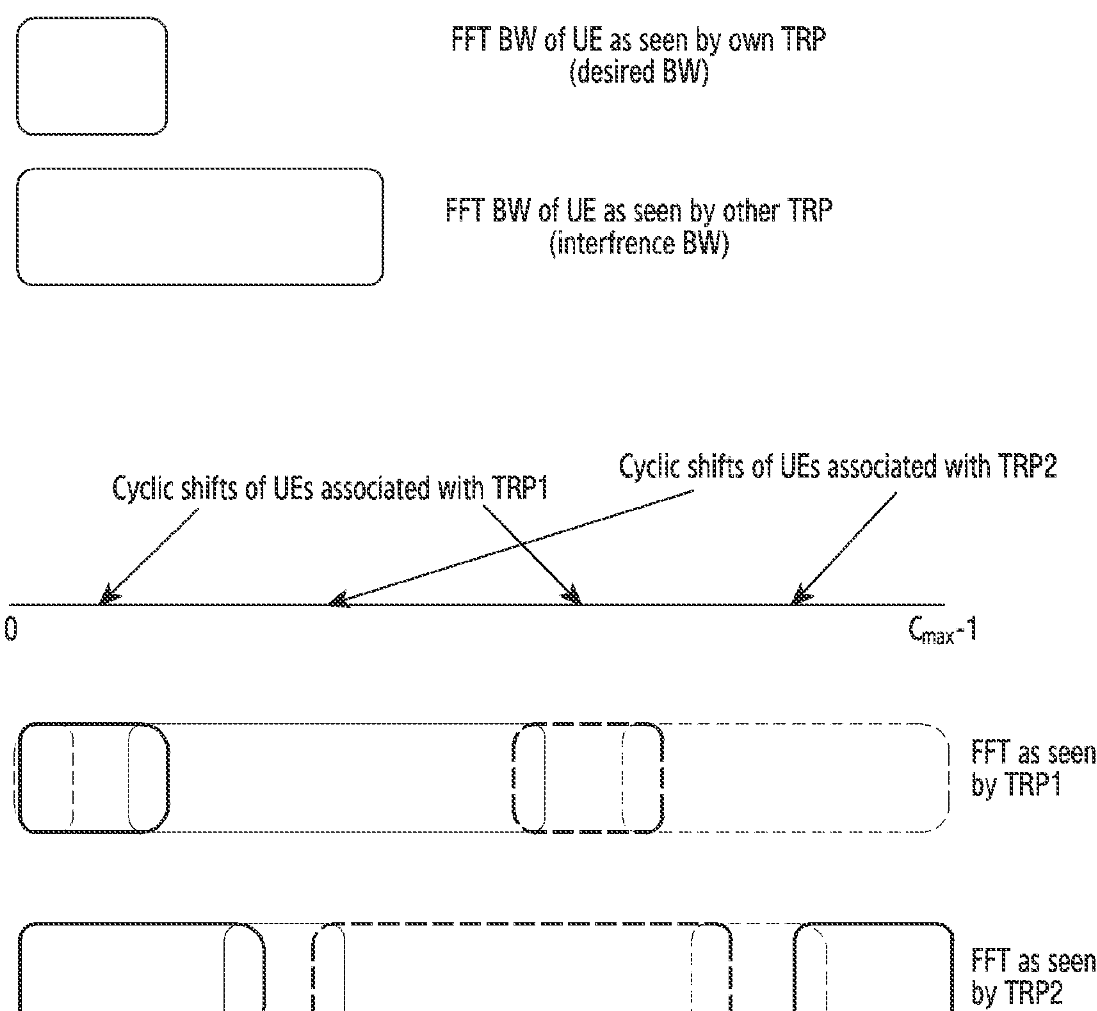
Figure 17:
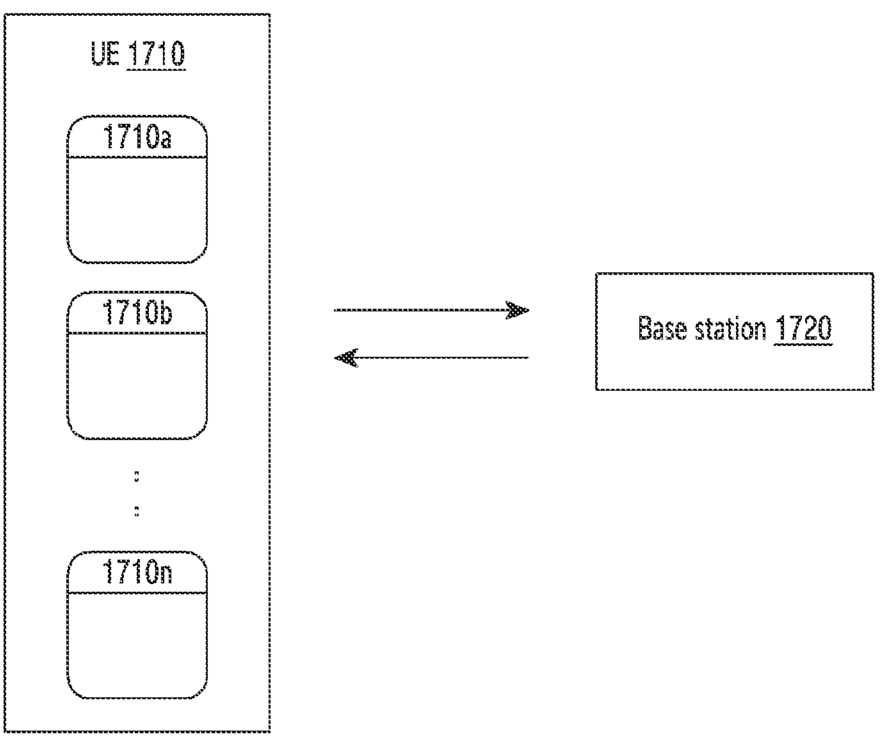
Figure 18:
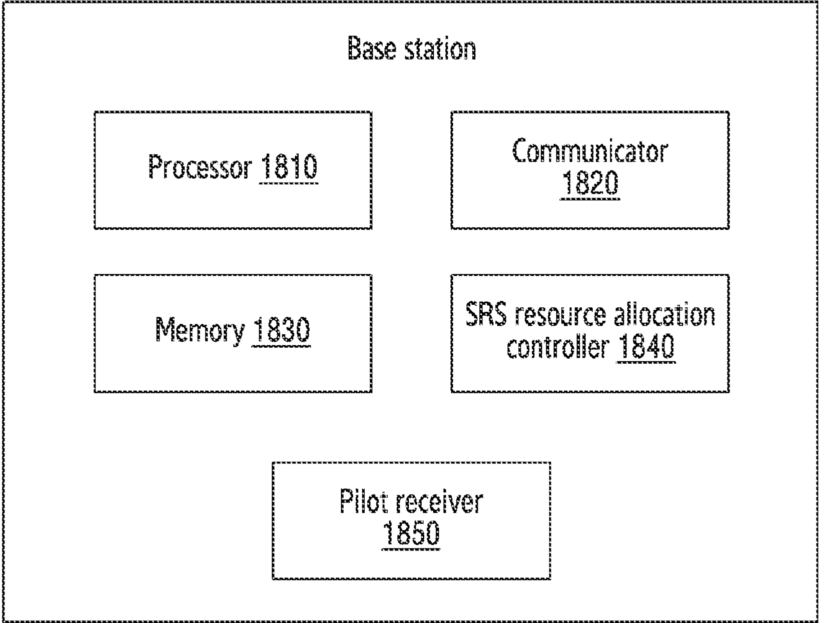
Figure 19:
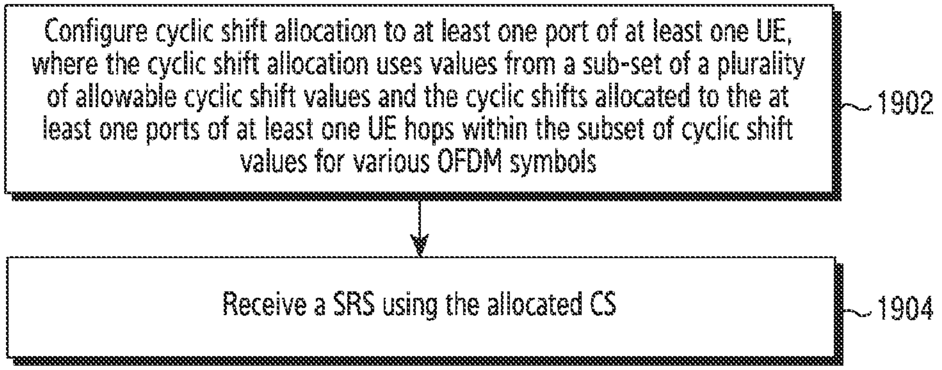
Figure 20:
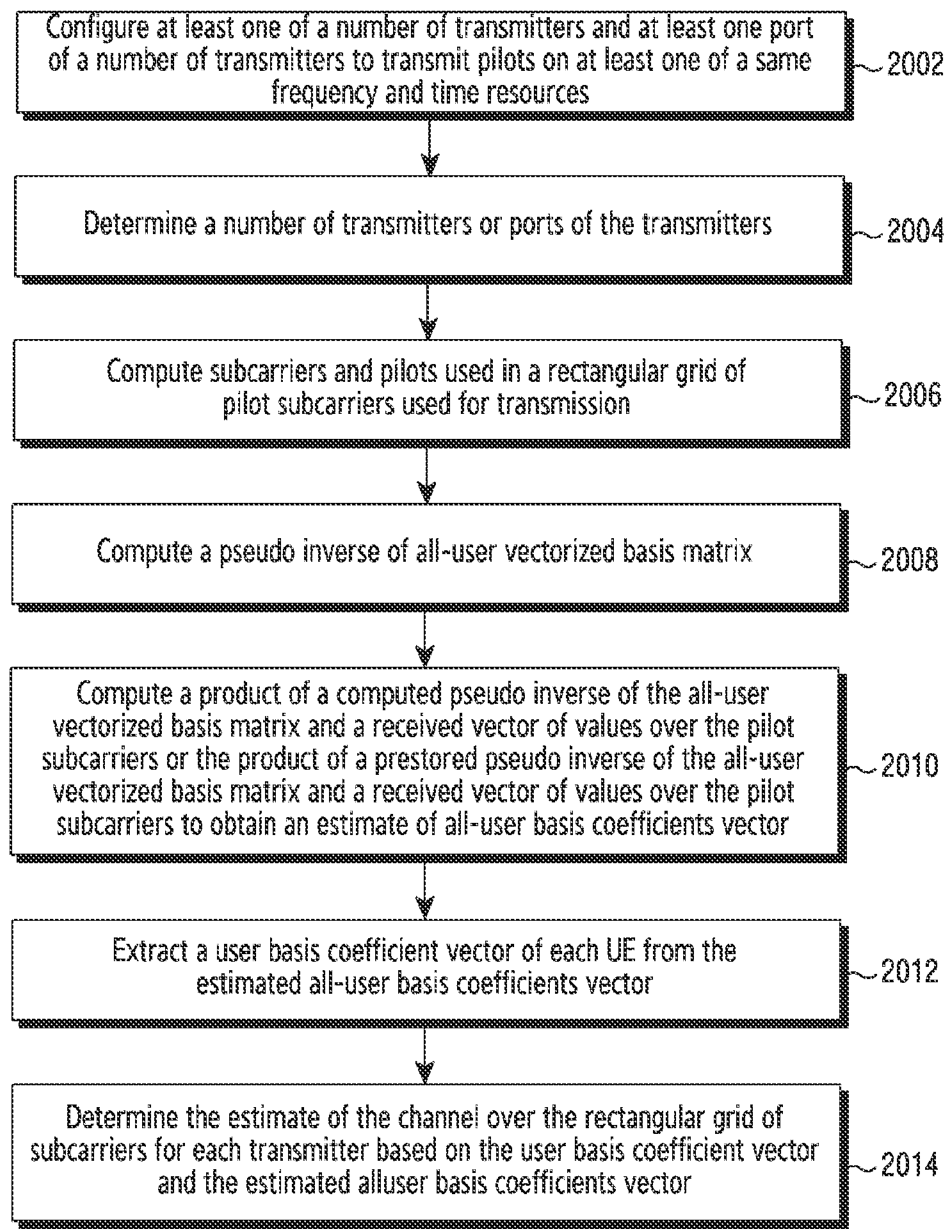
Figure 21:
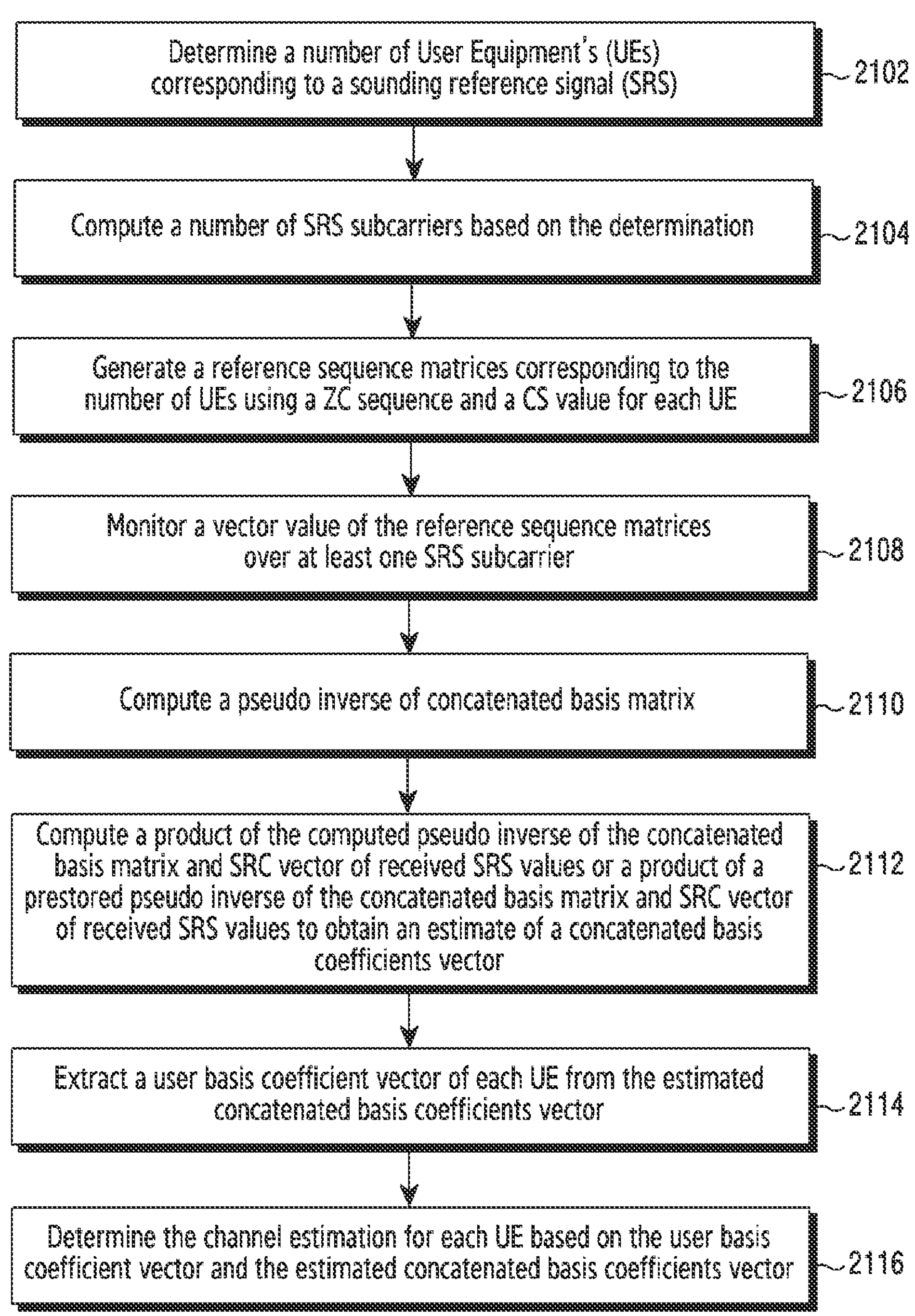
Figure 22:
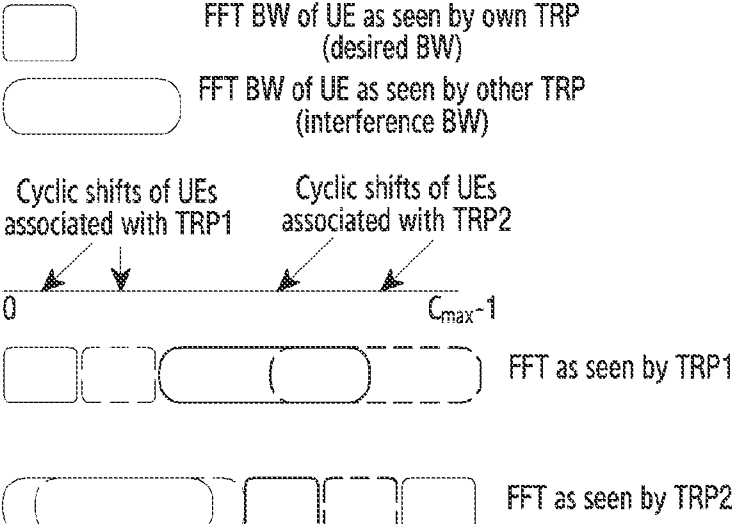
Figure 23:
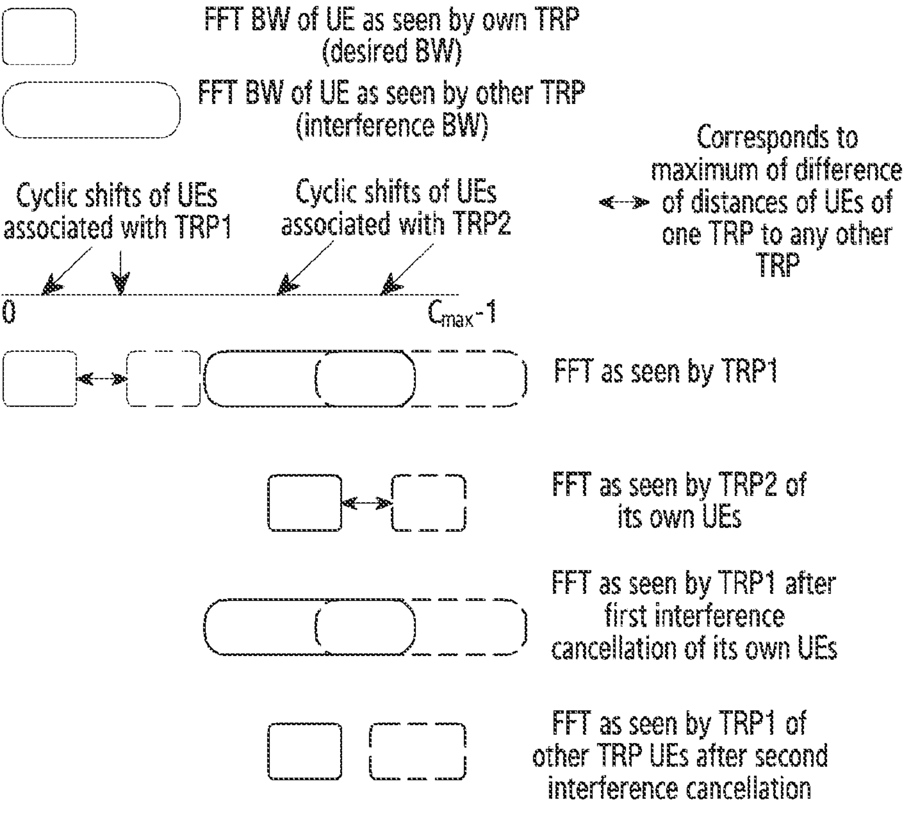
Figure 24:
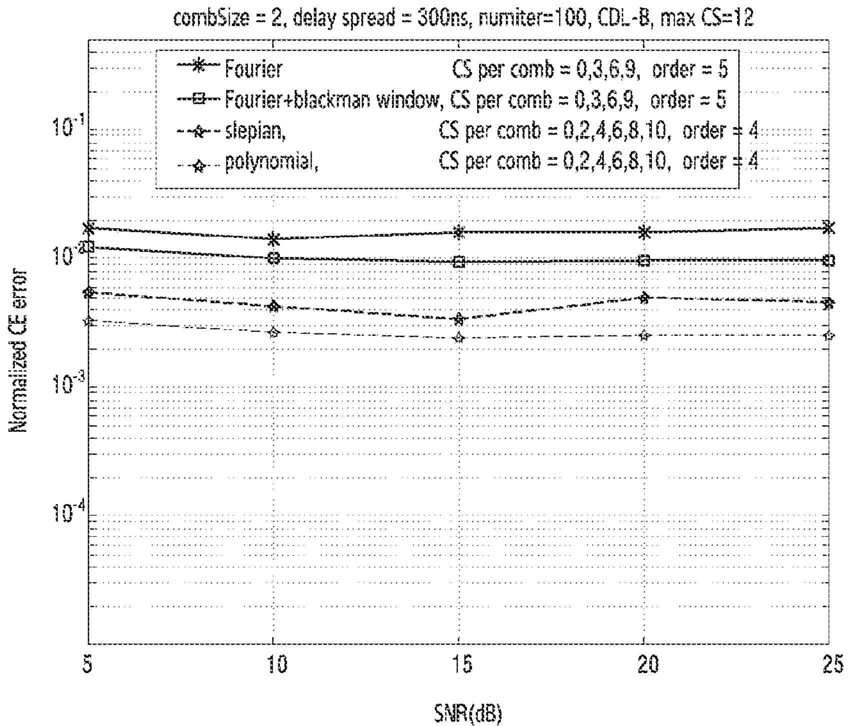
Figure 25:
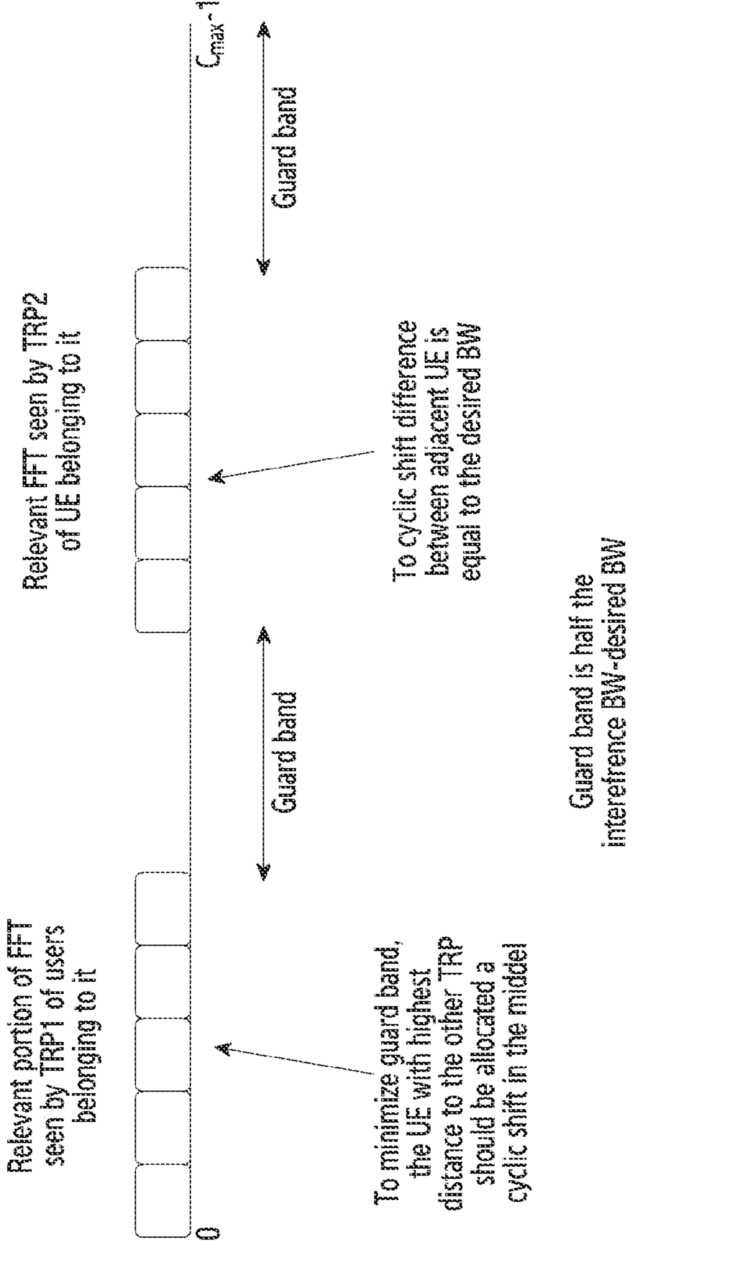
Figure 26:
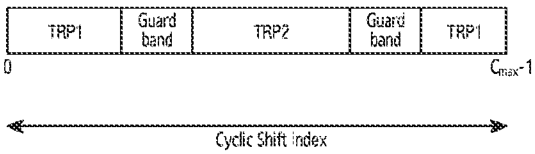
Figure 27:
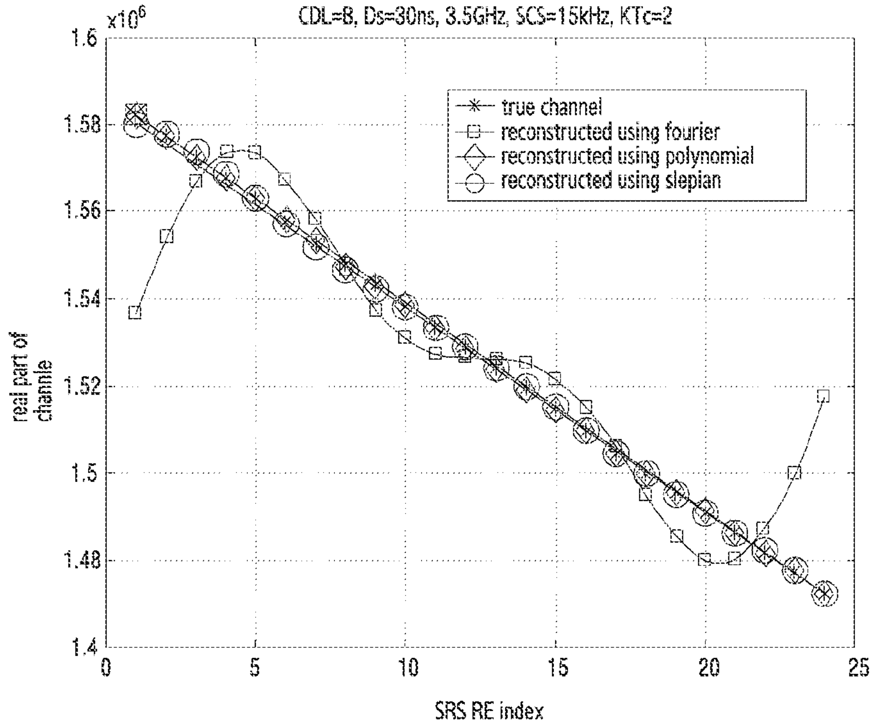
Figure 28:
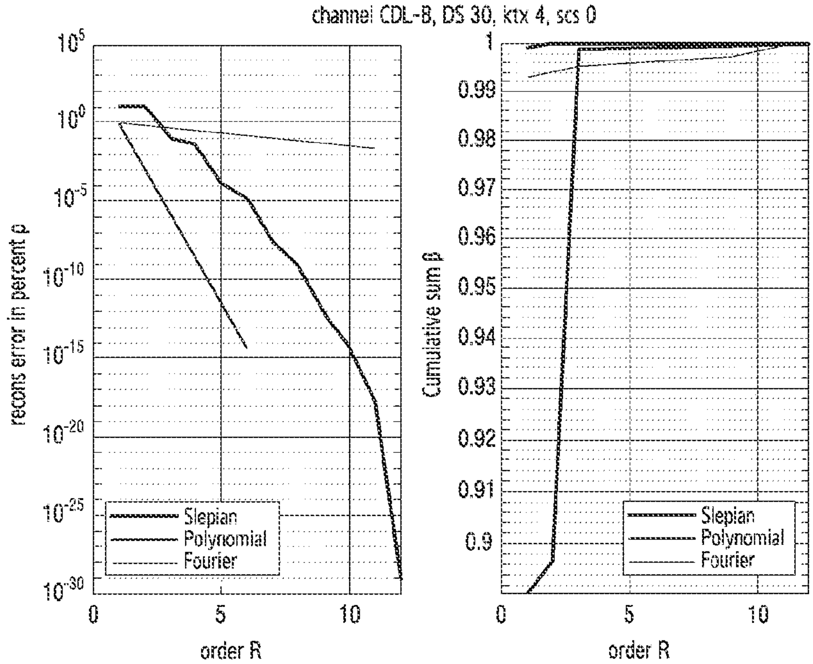
Figure 29:
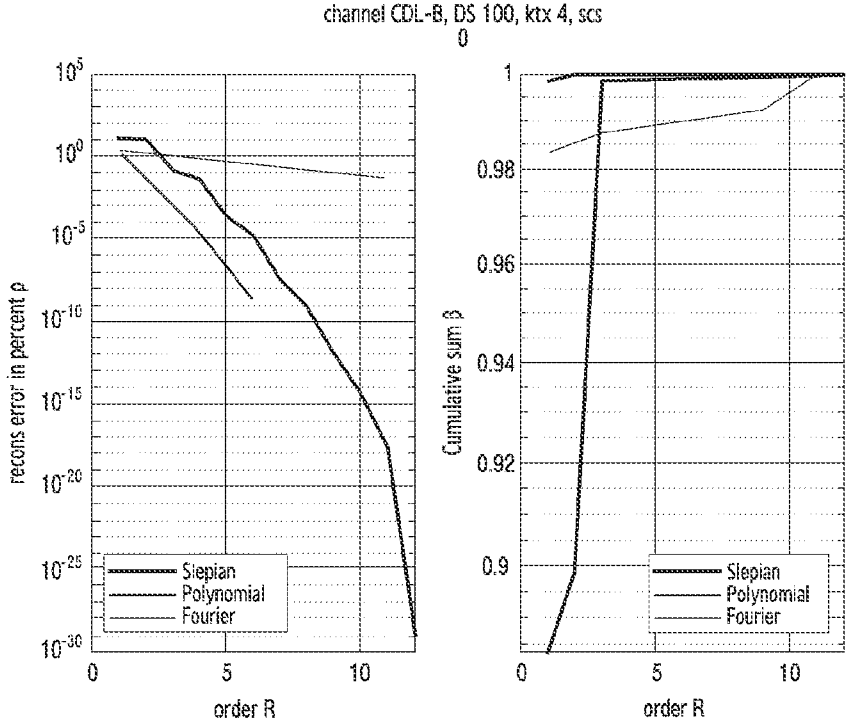
Figure 30:
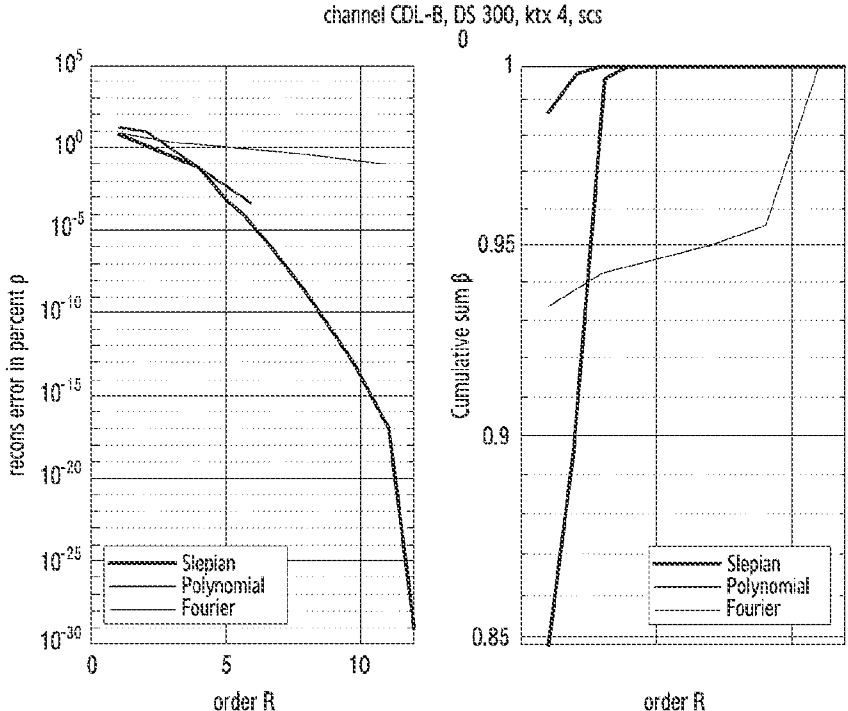
Figure 31:
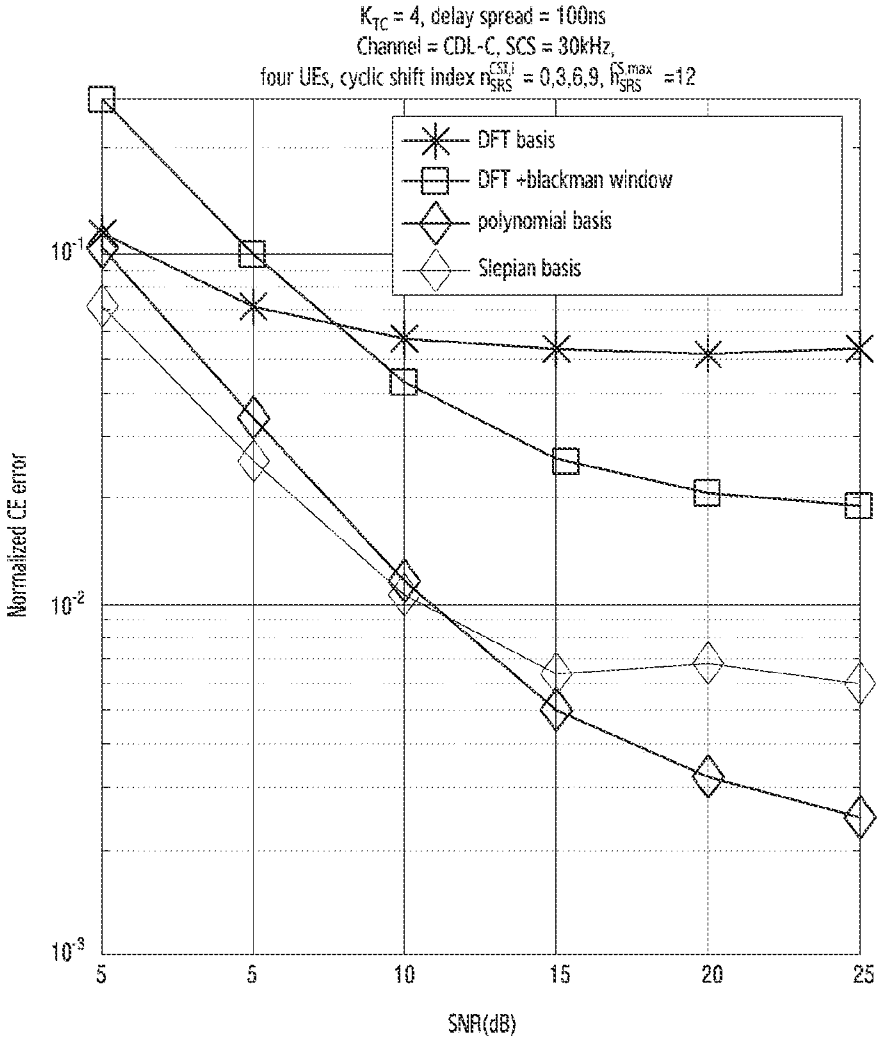
Figure 32:
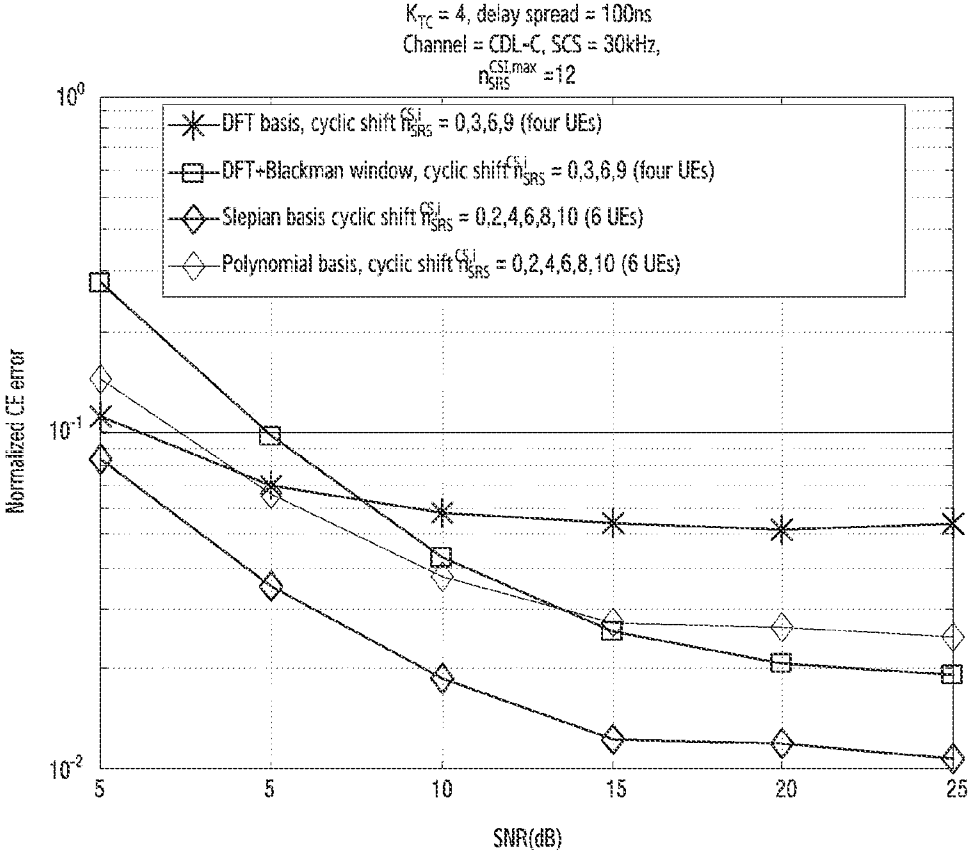
Figure 33:
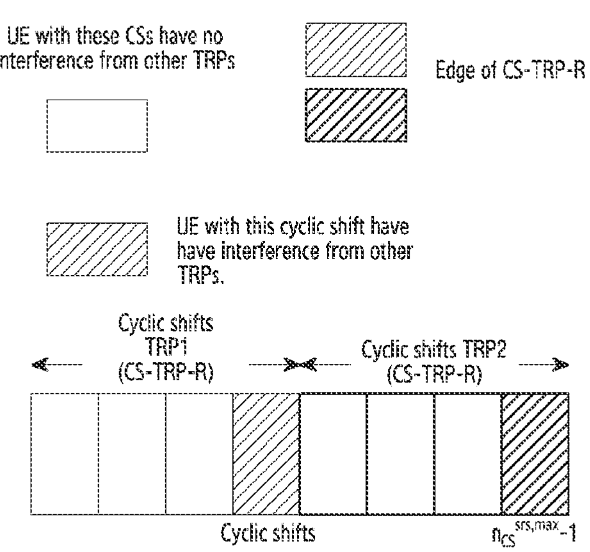
Figure 34:
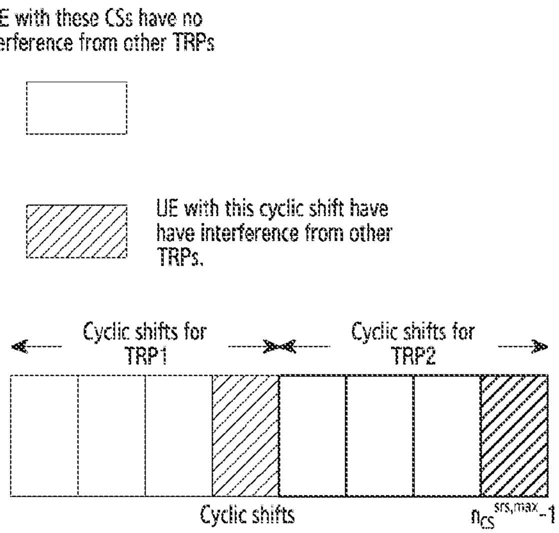
Figure 35:
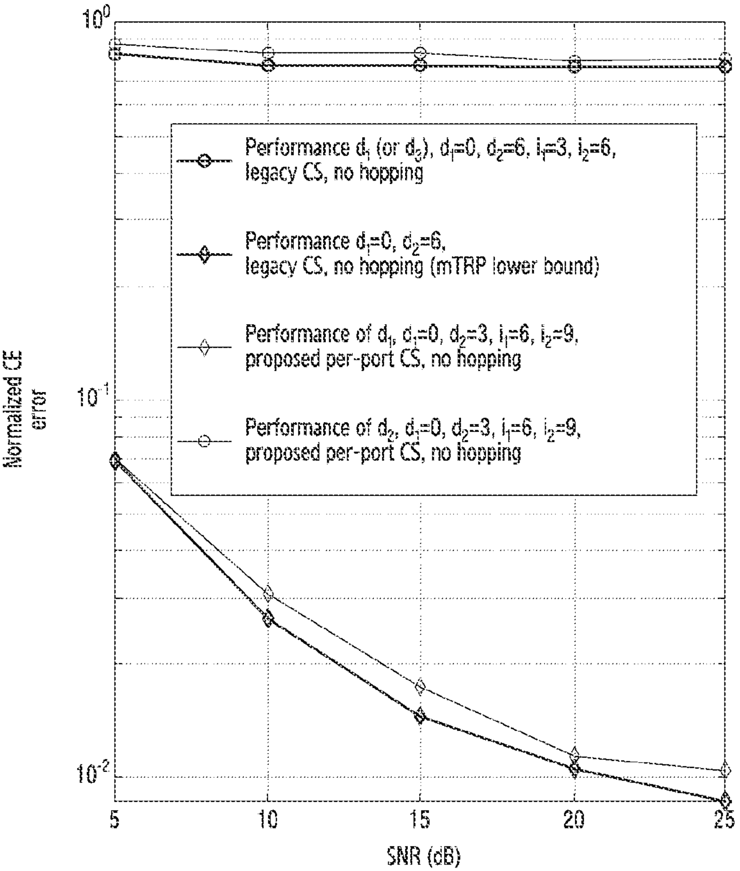
Figure 36:
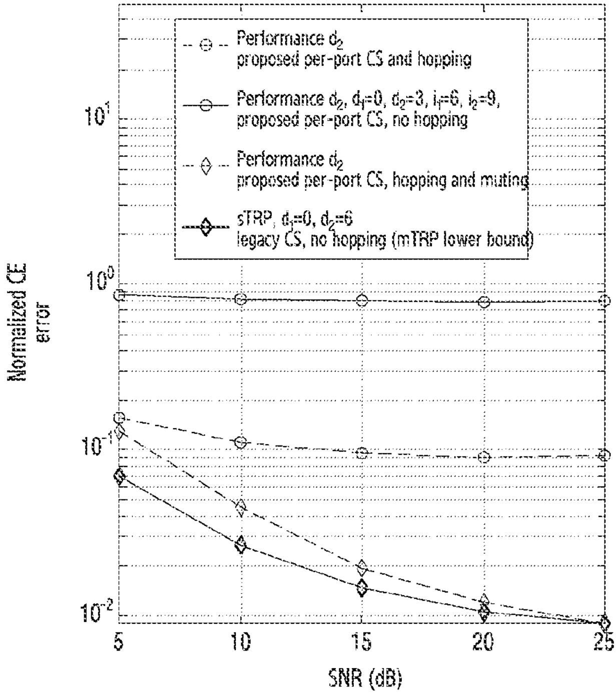
Figure 37:
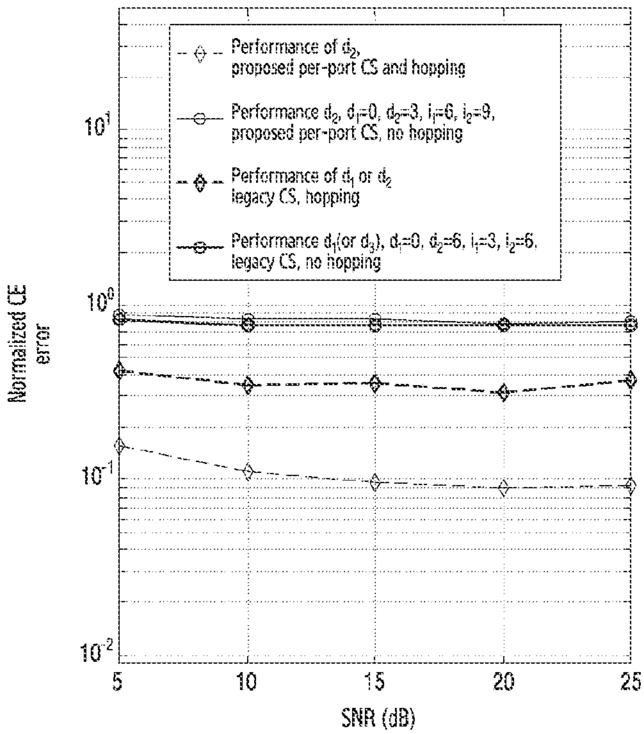
Figure 38:
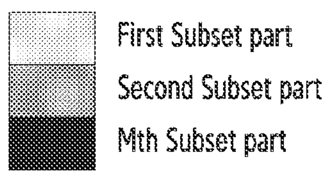
Figure 38:
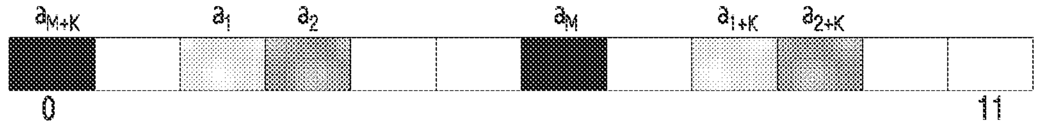
Figure 39:
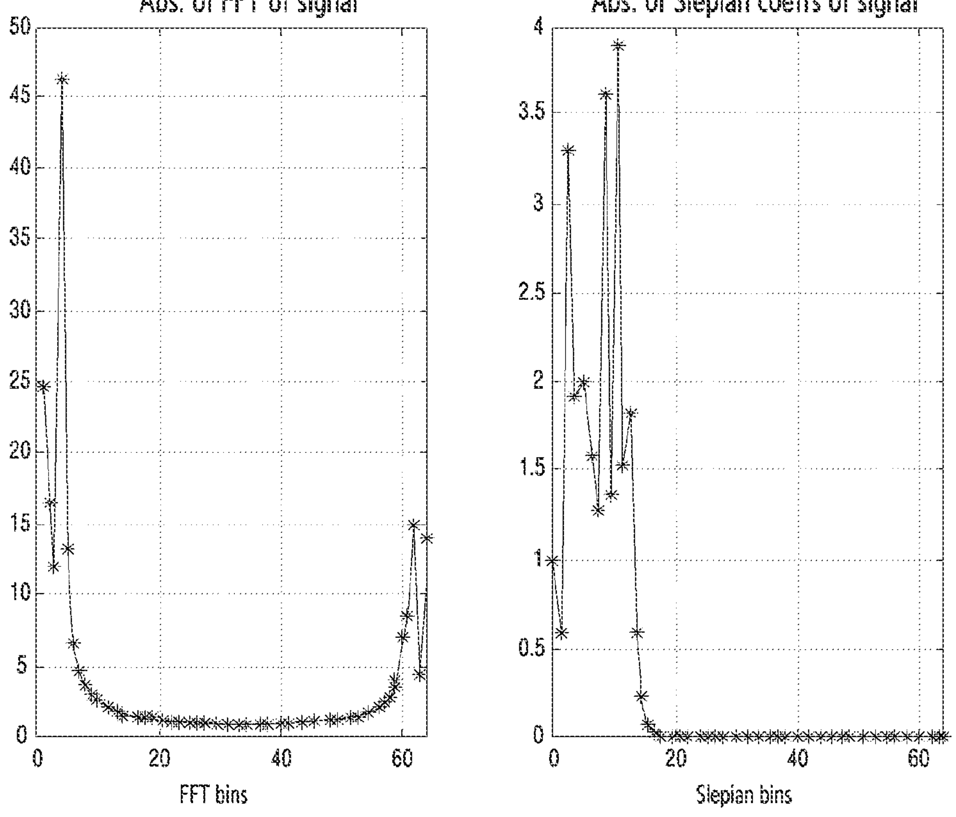
Figure 40:
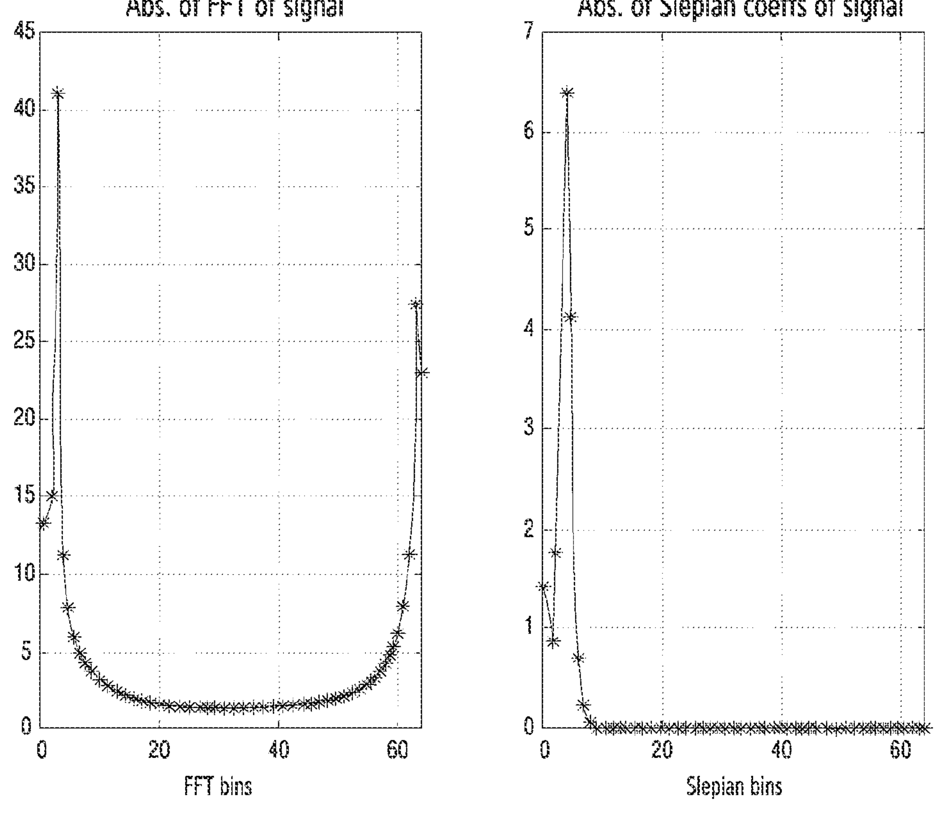
Figure 41:
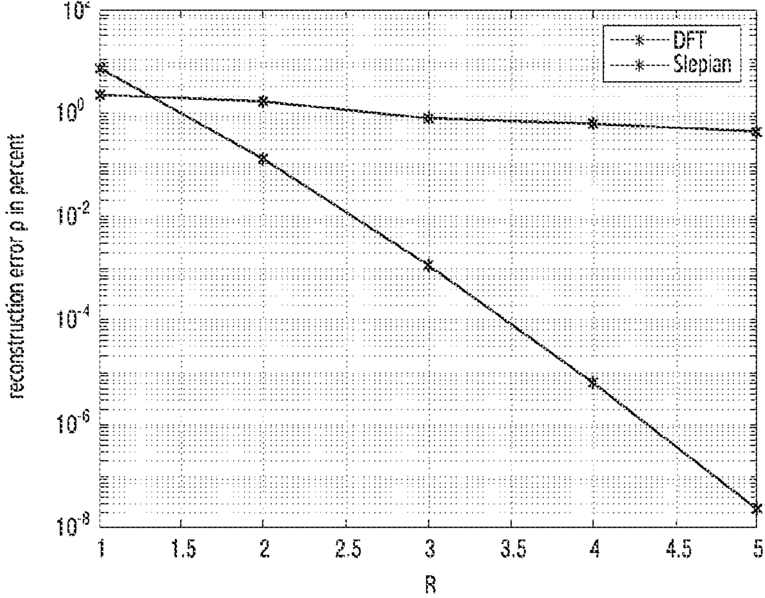
Figure 42:
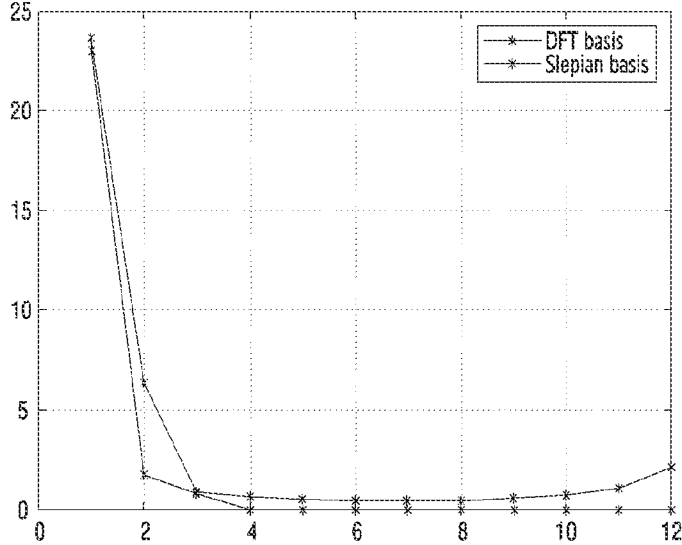
Figure 43:
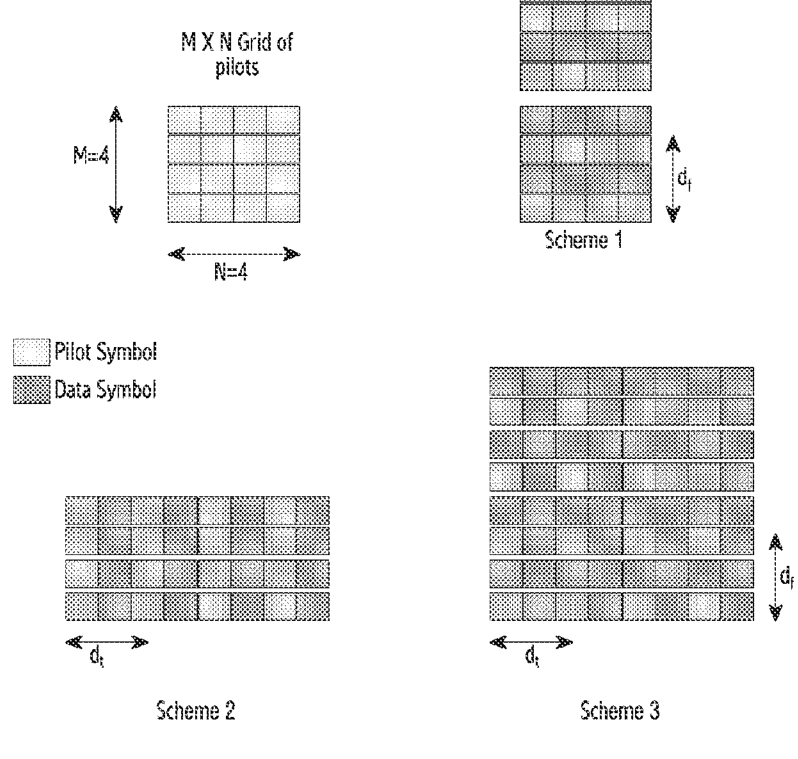
Figure 44:
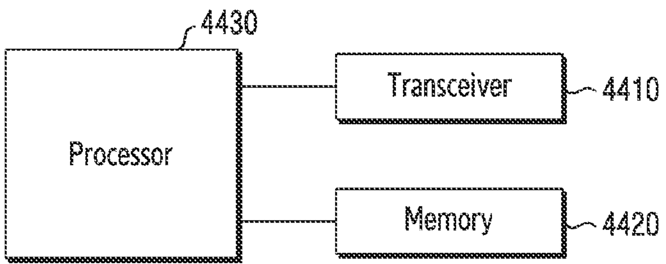

FIG. illustrates an SRS being transmitted on every $N^{th}$ subcarrier;

FIG. 3 illustrates an SRS being transmitted once every transmission comb (kTC) subcarriers in a frequency domain;

FIG. 4 illustrates a 2-TRP scenario in which TRP1 and TRP2 are synchronized to each other;

FIG. 5 illustrates a scenario in which fast Fourier transforms (FFTs) of a transmission (Tx), a channel, and a reception (Rx) are depicted;

FIG. 6 is a graph illustrating FFT of a channel at SRS resource elements (REs) due to timing offset/propagation delay;

FIG. 7 is a graph illustrating FFT of a channel at SRS REs due to timing offset/propagation delay;

FIG. 8 is a graph in illustrating FFT of a channel at SRS REs due to timing offset/propagation delay;

FIG. 9 is a graph illustrating FFT of a channel at SRS REs due to timing offset/propagation delay;

FIG. 10 is a graph illustrating FFT of a channel at SRS REs due to timing offset/propagation delay;

FIG. 11 is a graph illustrating FFT of a channel at SRS REs due to timing offset/propagation delay is depicted;

FIG. 12 is a graph illustrating FFTs of a channel at SRS REs;

FIG. 13 is a graph illustrating FFTs of a channel at SRS REs;

FIG. 14 is a graph illustrating FFTs of a channel at SRS REs;

FIG. 15 is a graph illustrating FFTs of a channel at SRS REs;

FIG. 16 illustrates CS allocation as per existing standards;

FIG. 17 illustrates a wireless network for managing SRS CS resource allocation, according to an embodiment;

FIG. 18 illustrates a BS (or TRP unit), according to an embodiment;

FIG. 19 is a flow chart illustrating a method for managing SRS CS resource allocation in a wireless network, according to an embodiment;

FIG. 20 is a flow chart illustrating a method for channel estimation in a wireless network, according to an embodiment;

FIG. 21 is a flow chart illustrating a method for channel estimation in a wireless network, according to an embodiment;

FIG. 22 illustrates a method of CS allocation, according to an embodiment;

FIG. 23 illustrates a method of CS allocation, according to an embodiment;

FIG. 24 is a graph illustrating a capacity improvement, according to an embodiment;

FIG. 25 illustrates allocation of a CS to UEs, according to an embodiment;

FIG. 26 illustrates allocation of a CS to UEs, according to an embodiment;

FIG. 27 is a graph illustrating Gibbs phenomenon;

FIG. 28 is a graph illustrating a metrics comparison, according to an embodiment;

FIG. 29 is a graph illustrating a metrics comparison, according to an embodiment;

FIG. 30 is a graph illustrating a metrics comparison, according to an embodiment;

FIG. 31 is a graph illustrating a performance comparison, according to an embodiment;

FIG. 32 is a graph illustrating a performance comparison, according to an embodiment;

FIG. 33 illustrates allowable CSs broken in to two subsets and CS values associated with ports being hopped within a subset across orthogonal frequency-division multiplexing (OFDM) symbols, according to an embodiment;

FIG. 34 illustrates allowable CSs broken in to two subsets and CS values associated with ports being hopped and muted within a subset across OFDM symbols, according to an embodiment;

FIG. 35 is a graph illustrating a performance comparison of CS resource allocation according to an embodiment with legacy CS resource allocation methods;

FIG. 36 is a graph illustrating a performance comparison of CS resource allocation according to an embodiment with legacy CS resource allocation methods;

FIG. 37 is a graph illustrating a performance comparison of CS resource allocation according to an embodiment with legacy CS resource allocation methods;

FIG. 38 illustrates a method of forming subsets from a set of allowable CS values, according to an embodiment;

FIG. 39 is graph illustrating a Slepian sequence—time half bandwidth product, according to an embodiment;

FIG. 40 is a graph illustrating a Slepian sequence—time half bandwidth product, according to an embodiment;

FIG. 41 is a graph illustrating $R_F$ and $R_S$, according to an embodiment;

FIG. 42 is a graph illustrating an $R_F$ and an $R_S$ is, according to an embodiment;

FIG. 43 illustrates 2-dimensional (2D) pilots, according to an embodiment;

FIG. 44 illustrates a BS according to an embodiment; and

Figure 45:
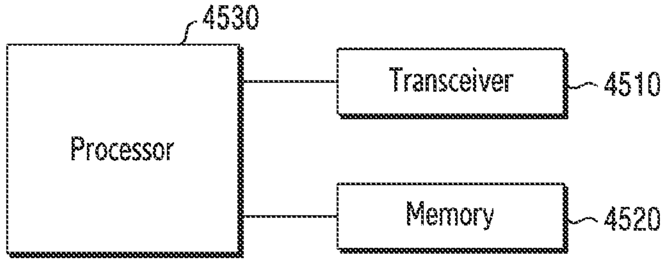

FIG. 45 illustrates a UE according to an embodiment.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to their bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

Singular forms such as "a," "an," and "the" include plural referents unless the context clearly dictates otherwise. Thus, for example, reference to "a component surface" includes reference to one or more of such surfaces.

Before undertaking the DETAILED DESCRIPTION below, it can be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, connect to, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller can be implemented in hardware or a combination of hardware and software and/or firmware. The functionality associated with any particular controller can be centralized or distributed, whether locally or remotely.

The phrase "at least one of," when used with a list of items, indicates that different combinations of one or more of the listed items can be used, and only one item in the list can be needed. For example, "at least one of: A, B, and C" includes any of the following combinations: A, B, C, A and B, A and C, B and C, and A and B and C. For example, "at least one of: A, B, or C" includes any of the following combinations: A, B, C, A and B, A and C, B and C, and A, B and C.

Various functions described below can be implemented or supported by one or more computer programs, each of which is formed from computer-readable program code and embodied in a computer-readable medium. The terms "application" and "program" refer to one or more computer programs, software components, sets of instructions, procedures, functions, objects, classes, instances, related data, or a portion thereof adapted for implementation in a suitable computer-readable program code. The phrase "computer-readable program code" includes any type of computer code, including source code, object code, and executable code. The phrase "computer-readable medium" includes any type of medium capable of being accessed by a computer, such as read-only memory (ROM), random access memory (RAM), a hard disk drive, a compact disc (CD), a digital video disc (DVD), or any other type of memory.

A "non-transitory" computer-readable medium excludes wired, wireless, optical, or other communication links that transport transitory electrical or other signals. A non-transitory computer-readable medium includes media where data can be permanently stored and media where data can be stored and later overwritten, such as a rewritable optical disc or an erasable memory device.

Terms used herein to describe the embodiments of the disclosure are not intended to limit and/or define the scope of the disclosure. For example, unless otherwise defined, the technical terms or scientific terms used in the disclosure shall have the ordinary meaning understood by those with ordinary skills in the art to which the disclosure belongs.

Numerical terms such as "first", "second," etc., and similar words used in the disclosure do not express any order, quantity or importance, but are only used to distinguish different components.

As used herein, any reference to "an example" or "example", "an implementation" or "implementation", "an embodiment" or "embodiment" indicates that particular elements, features, structures or characteristics described in connection with the embodiment is included in at least one embodiment. The phrases "in one embodiment" or "in one example" appearing in different places in the specification do not necessarily refer to the same embodiment.

As used herein, "a portion of" something means "at least some of" the thing, and as such may mean less than all of, or all of, the thing. As such, "a portion of" a thing includes the entire thing as a special case, i.e., the entire thing is an example of a portion of the thing.

As used herein, the term "set" indicates one or more. Accordingly, a set of items can be a single item or a collection of two or more items.

In this disclosure, to determine whether a specific condition is satisfied or fulfilled, expressions, such as "greater than" or "less than" are used by way of example and expressions, such as "greater than or equal to" or "less than or equal to" are also applicable and not excluded. For example, a condition defined with "greater than or equal to" may be replaced by "greater than" (or vice-versa), a condition defined with "less than or equal to" may be replaced by "less than" (or vice-versa), etc.

The term "include" or "comprise" indicates that elements or objects appearing before the word encompass the listed elements or objects appearing after the word and their equivalents, but other elements or objects are not excluded. Words such as "connect" or "connected" are not limited to physical or mechanical connection, but can include electrical connection, whether direct or indirect.

"Upper", "lower", "left" and "right" are only used to express a relative positional relationship, and when an absolute position of the described object changes, the relative positional relationship may change accordingly.

Those skilled in the art will understand that the principles of the disclosure can be implemented in any suitably arranged wireless communication system. For example, although the following detailed description of the embodiments of the disclosure will be directed to long term evolution (LTE) and/or 5G communication systems, those skilled in the art will understand that the main points of the disclosure can also be applied to other communication systems with similar technical backgrounds and channel formats with slight modifications without departing from the scope of the disclosure. The technical schemes of the embodiments of the application can be applied to various communication systems, and e.g., the communication systems may include global systems for mobile communications (GSM), code division multiple access (CDMA) systems, wideband code division multiple access (WCDMA) systems, general packet radio service (GPRS) systems, LTE systems, LTE frequency division duplex (FDD) systems, LTE time division duplex (TDD) systems, universal mobile telecommunications system (UMTS), worldwide interoperability for microwave access (WiMAX) communication systems, 5G systems or NR systems, etc. In addition, the technical schemes of the embodiments of the application can be applied to future-oriented communication technologies. In addition, the technical schemes of the embodiments of the application can be applied to future-oriented communication technologies.

In order to meet the increasing demand for wireless data communication services since the deployment of 4G communication systems, efforts have been made to develop improved 5G or pre-5G communication systems. 5G or pre-5G communication systems may also be called "beyond 4G networks" or "post-LTE systems".

In release 18 of 3rd generation partnership project (3GPP), operators of wireless networks are looking at SRS enhancements to manage inter-TRP cross-SRS interference targeting TDD coherent joint transmission (CJT) via SRS capacity enhancement and/or interference randomization, with the constraints that 1) without consuming additional resources for the SRS, 2) reuse existing SRS comb structure, and 3) without new SRS root sequences.

In release 18, the operators of the wireless networks are also looking at "Study, and if justified, specify the following: Two Timing Advances (TAs) for uplink (UL) multi-DCI for multi-TRP operation". This means the TRPs know the propagation delay of the UEs to all the TRPs. This also means the user can know the leakage of the effective channel (channel+timing offset to a TRP due to propagation delay). If the UE belongs to the same TRP, timing offset is zero (its signals reach the TRP synchronized), however its signals reach the other TRP with a timing offset due to propagation delays between TRPs. Accordingly, even if a small cell is used, where the channel is very less frequency selective, the effective channel due to the propagation delay to the other TRP can be more frequency selective. In such a case, it may be better to have configurable CS per port, rather than having equi-distant CSs across all ports (as per the existing methods). Note that $UE_{m,n}$ indicates an $n^{th}$ UE associated with an $m^{th}$ TRP. For simplicity, the number of TRPs=2.

Figure 1:
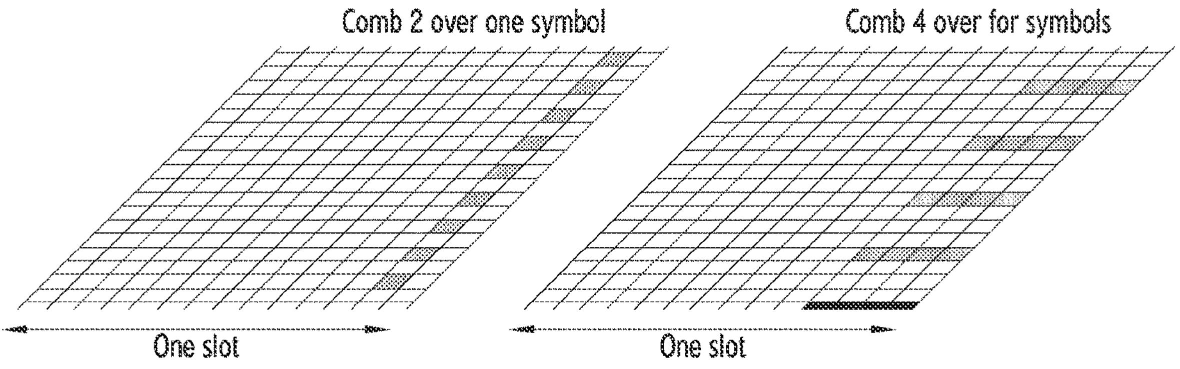
FIG. 1 illustrates an SRS being transmitted on every $N^{th}$ subcarrier.
Figure 2:
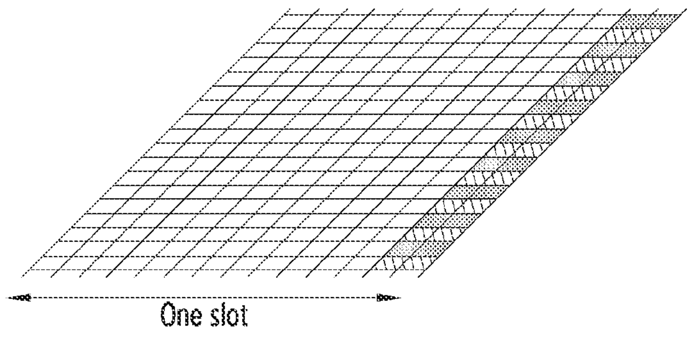

FIGS. 1 and 2 illustrate an SRS being transmitted on every $N^{th}$ subcarrier.

Referring to FIG. 1 and FIG. 2, the SRS is transmitted on every $N^{th}$ subcarrier, where N can take the values two or four or eight ("comb-2" and "comb-4," respectively). The SRS transmissions from different devices can be frequency multiplexed within the same frequency range by being assigned different combs corresponding to different frequency offsets. For comb-2, i.e., when the SRS is transmitted on every second subcarrier, two SRS can be frequency multiplexed. In the case of comb-4, up to four SRS can be frequency multiplexed.

FIG. 3 illustrates an SRS being transmitted once every kTC subcarriers in a frequency domain.

Referring to FIG. 3, the SRS is transmitted once every kTC subcarriers in a frequency domain. In every slot, it has $$N_{symb}^{srs}$$

OFDM symbols, and per OFDM symbol has a length of $$M_{sc,b}^{srs}$$

subcarriers. It has a configurable periodicity of T slots and SRS has the same value across slots and OFDM repetitions. The $n^{th}$ subcarrier value is $$e^{\frac{j2\pi c(p)n}{s}}\bar{r}_{u,v}(n),$$

where $\bar{r}_{u,v}(n)$ is a Zadoff-Chu (ZC) sequence, c(p) is the CS for the pth port/user(e.g. a UE) (denoted by $$n_{srs}^{cs,i}$$

in 38.211 3GPP standards document and S is period of CS (denoted by $$n_{srs}^{cs,max})$$

and can take values of 8, 12, or 6 depending on kTC.

FIG. 4 illustrates a 2-TRP scenario in which a first TRP and a second TRP are synchronized.

Referring to FIG. 4, a $UE_{1,1}$'s signal reached the first TRP with the timing offset=0 due to TA, and a $UE_{2,1}$'s signal reaches the first TRP with the non-zero timing offset due to a propagation delay. Likewise, a $UE_{2,1}$'s signal reached the second TRP with timing offset=0 due to TA, and the $UE_{1,1}$'s signal reaches the second TRP with non-zero timing offset due to a propagation delay.

FIG. 5 illustrates a scenario in which FFTs of a Tx, a channel, and an Rx are depicted.

Referring to FIG. 5, the FFT means the user takes FFT of SRS REs (that are kTC apart). Max CS is denoted by $c_{max}$. The FIG. 5 denotes a CS of c for the Tx signal. The channel has an FFT with a shift of S bins and a spread of b bins. The effective channel is due to actual channel and an exponential rotation due to timing offset of propagation delay. The FFT of the received signal is shifted by S and has a span of b.

Channel Effects Due to Timing Offset (Propagation Delay)

If there is a propagation delay or a timing offset of $t_{offset}$, then the channel of the $k^{th}$ subcarrier (with a frequency of $f_k$=k.15e3 for a subcarrier spacing (SCS- of 15e3) gets multiplied by $e^{-j2\pi f_k t_{offset}}$. If $$(SCS.t_{offset}.ktc) = \frac{c_{max} - S}{c_{max}},$$

then the effect of timing offset is to shift the FFT of the channel by S bins.

FIGS. 6 to FIG. 11 are graphs illustrating FFT of a channel at SRS REs due to timing offset/propagation delay. In FIGS. 6 to 11, the propagation delay corresponds to dist(m).

FIG. 12 to FIG. 15 are graphs illustrating FFTs of a channel at SRS REs.

FIG. 16 illustrates a method of CS allocation.

Referring to FIG. 18, the equi-distant allocation of CS s among UEs is not an efficient use of resources. Herein, a user can also refer to a port of a UE in the current document and vice versa.

Embodiments described herein provide methods for handling SRS resource allocation in multi-TRP in the wireless networks. The methods can be used to allocate CS and SRS resources efficiently. For example, a method includes configuring, by a BS or a TRP unit, CS allocation to at least one port of a UE The CS allocation uses values from a sub-set of a plurality of allowable CS values. Further, the method includes receiving, by the BS or the TRP unit, a SRS using the allocated CS.

If other TRP's UEs need to be decoded by a given TRP further processing should be done. A TRP first estimates the channel of its own UEs, and then from its received signal it cancels out the estimate of the received signal of its own UEs. This signal may be referred to as a received signal of other UEs (RSOUE). This step may be referred to as first interference cancellation.

The TRP then estimates the channels of UEs from other TRPs using RSOUE. Assuming that timing offsets of two UEs from other TRP to the desired TRP is $t_1$ and $t_2$, the channel of both these UEs overlap as $t_1$ and $t_2$ are both greater than zero. The method can be used to multiply RSOUE by $e^{j2\pi f_k a}$, where $a=t_2$ (assume $t_1>t_2$), so that the dispersion of the channels of the UEs of other TRPs as seen by the desired TRP is reduced. More importantly, they now do not overlap and both channels can be estimated.

The estimated channels are then multiplied by $e^{-j2\pi f_k a}$ to get the desired channel estimates. Here, a can be a general value used for any sets of UEs from interfering/other TRP's channel estimation at desired/own TRP.

The method can be used to allocate all UEs of a TRP in a contiguous fashion in the CS domain followed by a gap, followed by all UEs of another TRP, etc., followed by another gap, and so on, until all CSs are exhausted. The gap of CSs is a function of some extra propagation distance of signals from UEs of one TRP to the other TRPs. The gap can optionally be zero.

The CS domain may be broken into many regions. Each two regions are separated by a guard band. The regions (TRP1 and TRP2) are allocated to UEs of TRP1 and TRP2, respectively. The CS allocation of per-port configuration can also be done as follows. The method allocates TRP1 to UEs belonging to TRP1 and TRP2 to UEs belonging to TRP2. This can be done via an RRC message. Within each region, equi-distant allocation is possible to ports of the UE. Only starting is signaled. The region wraps around if needed. Alternately, the method can set a starting position and increment to cover all ports of the UE.

The methods can also be used for resource assignment. The method includes defining all UE associated with a TRP as UE group (UEG). The UEG can have many resource groups (RG). Each RG uses the same comb, same $c_{max}$.

Further, the method includes determining the maximum of desired bandwidth (BW) for each UEG. Further, the method includes determining interference BW of all UEs.

The method includes arranging the UEs in the UEG in decreasing order of their distances to other TRP. Further, the method includes allocating all UEs in a UEG (preference to the ones with maximum distance to other TRPs) to one comb such that difference in CSs between two UEs is less than a maximum of a desired BW of UEs in that comb. This is done for all UEGs.

Further, the method includes using appropriate comb length or $C_{max}$. For leftover UEs of UEGs of different TRPs, the method accommodates them in a same comb with appropriate guard band. Such a comb may be called a mixed-comb. This comb will have UEs belonging to other TRPs too. In a mixed comb, the guard band can be less than half of the difference between interference BW and desired BW. In such a case, the methods resort to CS hopping and/or comb hopping to reduce interference. CS hopping: some or all or only the edge UEs' CSs are hopped among themselves.

Comb hopping: The resource group in a comb or hopped across all combs to reduce interference. The method is at one time instant. The method can run for various time instances to multiplex many UEGs/UEs in time as well.

Accordingly, the embodiments herein provide a receiver for an SRS as well. In the receiver, channel estimation is done for $N_U$ SRS UEs using same time-frequency resources. Here, let the channel vector of the $i^{th}$ user be denoted by the N×1 vector $$h_i = \phi_M^{(R)} x_M^{(R,i)},\ \phi_M^{(R)}$$

is the basis matrix (Slepian, polynomial, discrete Fourier transform (DFT), oversampled DFT, discrete cosine transform (DCT), Karhunen-Loeve or any other basis matrix), and subscript M denotes the choice of method and basis coefficient vector $$x_M^{(R)}$$

for the $i^{th}$ user is denoted $$x_M^{(R,i)}.$$

Denote A=

$$\left[ r_1 \phi_M^{(R)} \ \ldots \ r_{N_U} \phi_M^{(R)} \right] x_{all}$$

where $x_{all}$ is a concatenation of basis coefficient vectors of all UEs as $$x_{all} = \begin{bmatrix} x_M^{(R,1)} \\ \vdots \\ x_M^{(R,N_U)} \end{bmatrix},$$

where $r_i$ is N×N diagonal matrix with reference sequence (ZC sequence and CS exponential) of the $i^{th}$ user along the diagonal.

In the receiver, the user of the BS have $y=Ax_{all}$ and estimate $x_{all}$ as $\hat{x}_{all}=(A^H A)^{-1} A^H y$. From $\hat{x}_{all}$, the proposed method can be used to compute and estimate $$\hat{x}_M^{(R,i)}$$

and $$\hat{h}_i = \phi_M^{(R)} \hat{x}_M^{(R,i)}.$$

A method according to an embodiment provides performance improvement for a receiver and/or capacity improvement in the system. The method can be used to allocate CS, maximum CS, comb size per SRS-port thereby using RRC messages SRS resources efficiently.

The method shows advantages of configuring CS and maximum CS per port. This becomes important as in mTRP, the SRS from a different TRP will have a different timing advance (TA) (or timing offset) compared to SRS from own TRP. The user of the networks study this effect in detail and show how configuring CS per port offers advantages. In the existing method suggest that the TA offset between SRSs at a TRP may not be a big issue if they are small relative to a cyclic prefix (CP) length, even if all the SRSs with some arrival timing differences are to be used for channel estimation.

The method can be used to configure the subset of comb offsets when comb offset hopping is configured, and configure a subset of CSs when CS hopping is configured. The subset configuration applies to all the ports in the SRS resource, and all of the ports in the SRS resource have the same hopping offset value $$k_{hopping}^{(p_i)}$$

on an OFDM symbol.

The method can be used to manage inter-TRP cross-SRS interference targeting TDD CJT via SRS interference randomization and/or capacity enhancement by using a CS hopping.

The method provides a randomized code-domain resource mapping for SRS transmission by introducing CS hopping/randomization to an SRS resource.

FIG. 17 illustrates a wireless network for managing SRS CS resource allocation, according to an embodiments.

Referring to FIG. 17, the wireless network may be a 4th generation (4G) network, a 5G network, a 6G network, and an open radio access network (ORAN).

The wireless network includes a UE (or transmitter) 1710 and a BS (or TRP unit) 1720 (a receiver). The UE includes plurality of UEs (1710*a*-1710*n*). The BS 1720 may be a gNB, an eNB, or an NR transceiver. The UE 1710 may be a laptop, a smart phone, a desktop computer, a notebook, a device-to-device (D2D) device, a V2X device, a foldable phone, a smart television (TV), a tablet, an immersive device, or an Internet of things (IoT) device.

The BS 1720 configures a CS allocation to at least one port of the UE 100. The CS allocation uses values from a sub-set of a plurality of allowable CS values.

The BS 1720 distributes a plurality of allowable CS values into a first sub-set of CS values and a second sub-set of CS values, etc., into many subsets. The first sub-set of CS values is provided as a set of contiguous CS values and the second sub-set of CS resource is provided in another set of contiguous CS values. Further, the BS 1720 assigns a guard band between the sub-sets of CS values. CSs from these guard bands will not be allocated to any UEs. Optionally this guard band can be zero or not present.

Further, the BS 1720 allocates the CSs from each sub-set of CS values to the at least one port of the UE 1710. Allocating the CS values from the subset of CS values is explicitly to all ports of the UE 1710. Alternatively, allocating the CS values from the subset of CS values, is to all ports of the UE 1710, such that the CS values are equidistant from one another over the subset of CS values.

The UE 1710 is served by a TRP assigned to one subset and is served by another TRP assigned to another subset. The UE 1710 may be a single port UE. The UE 1710 may be a single port UE and the CS values assigned to the UE 1710 do not hop across the OFDM symbols. The CS allocation to the at least one port of the UE 1710 may be configured through an RRC message. Further, the BS 1720 hops the assigned CS values over different OFDM symbols to the at least one port of the UE 1710 within a subset. The hopping is across OFDM symbols. The subsets and CSs are RRC configured or through medium access control (MAC)-control element (CE) or through downlink control information (DCI).

The BS 1720 may distribute a plurality of allowable CS values into a first sub-set of CS values and a second sub-set of CS values, etc., into many subsets. Each sub-set of CS values may be divided into many subset parts. The number of subset parts is M, and k=cmax/Nap, where cmax is the maximum value of CS or a number of allowable CSs, and Nap is the number of ports of the UE 1710 that will use the subset. All subset parts will have equal number of CS values, wherein CS values $a_1$, $a_1$+k, . . . , $a_1$+(Nap−1)*k are in the first subset part, $a_2$, $a_2$+k, . . . , $a_2$+(Nap−1)*k are in the second subset part, . . . , $a_M$, $a_M$+k, . . . , $a_M$+(Nap−1)*k are in the Mth subset part, wherein M is greater than or equal to unity, wherein some, all, or none of $a_1$, $a_2$, . . . , $a_M$ are continuous, and wherein the "+" operation is under modulo of cmax. The combination of (cmax,Nap) is (12,4), (12,2), (12,1), (8,8), (8,4), (8,2), (8,1), (6,2), (6,1) . . . . The Nap ports of the UE 1710 are assigned values from one subset part of the subset in any OFDM symbol, e.g., as illustrated in FIG. 38. The subsets and CSs may be configured through RRC, MAC-CE, or DCI.

The CS values of Nap ports of the UE 1710 may hop within the same subset part of a given subset across OFDM symbols, or the CS values of Nap ports of the UE 1710 may all be within one subset part of the given subset in a given OFDM symbol and hop across different subset parts of the same given subset across different OFDM symbols. Alternatively, the CS values of Nap ports of the UE 1710 may all be within one subset part of the given subset in a given OFDM symbol and hop across different subset parts of different subset across different OFDM symbols.

The BS 1720 distributes a plurality of allowable CS values into a first sub-set of CS values and a second sub-set of CS values, etc., into many subsets such that the union of all these subsets is the set of all allowable CS values. The subsets and CSs may be configured through RRC, MAC-CE, or DCI.

The CS values of the at least one port of the UE 1710 may hop across the OFDM symbols such that each port has a CS value from one subset. The CS values of the at least one port of the UE 1710 may hop across the OFDM symbols such that each port has a CS value from one subset in some OFDM symbols, and another subset in other OFDM symbols, etc. The CS values of the ports essentially hop within different subsets and subsets vary in different OFDM symbols.

The subset may have at least one set of Nap CS values that are equidistant in the range of 0, . . . cmax-1, where cmax is the maximum number of CS value or maximum number of allowable CS values, wherein Nap is the number of ports of the UE, wherein the CS values of the Nap ports of the UE are assigned from one such set from the subset, wherein the CS values of the ports of the UE hop within the set across OFDM symbols, and wherein the set can be the same or different across OFDM symbols if the subset has more than one such set.

The CS values assigned to the ports can hop within one or more sets of one or more subsets across OFDM symbols. The CS values of the at least one port of the UE 1710 do not hop across the OFDM symbols and each port has a CS value from one subset. The single-port UE obtains the CS values from one subset and hops within the subset across the OFDM symbols.

The single-port UE may obtain the CS values from one subset and hop among different subsets across the OFDM symbols. Alternatively, the single-port UE may take CS values from one subset and not hop across the OFDM symbols. For example, consider cmax=12, Nap=2, and allowable CSs from 0-11. Furthermore, subset1=CSs 0,6, subset2=CSs 1,7,2,8, subset3=CSs 3,9,4,10 and subset4=CSs 5,11. In one embodiment, there are four SRS OFDM symbols, and in the first OFDM symbol, CS1,7 are assigned to the two ports of the UE. In the second OFDM symbol, CSs 7,1 are assigned to ports. In the third OFDM symbol, CS1,7 are assigned to the two ports of the UE. In the fourth OFDM symbol, CSs 7,1 are assigned to ports.

In another embodiment, there are four SRS OFDM symbols, and in the first OFDM symbol, CS1,7 are assigned to the two ports of the UE. In the second OFDM symbol, CSs 7,1 are assigned to ports. In the third OFDM symbol, CS2,8 are assigned to the two ports of the UE. In the fourth OFDM symbol, CSs 8,2 are assigned to ports.

In another embodiment, there are four SRS OFDM symbols, and in the first OFDM symbol, CS1,7 are assigned to the two ports of the UE. In the second OFDM symbol, CSs 9,3 are assigned to ports. In the third OFDM symbol, CS2,8 are assigned to the two ports of the UE. In the fourth OFDM symbol, CSs 10,4 are assigned to ports.

In a single-port UE, e.g., consider cmax=12, Nap=2, and allowable CSs from 0-11. There are three subsets. Subset1-CSs 0,3,4,10,11. Subset 2=CSs 1,5,6, subsets3=CSs 2,7,8, 9.

In one embodiment, the single port UE has CSs 0,4,3,11 in the first four OFDM symbols. In another embodiment, the single port UE has CSs 0,10,11 in the first three OFDM symbols and CSs6 in the fourth OFDM symbol and CSs 7,2 in the next OFDM symbols.

In another embodiment, the BS 1720 defines a plurality of UEs 1710 associated with the TRP unit as a UEG. The UEG includes multiple RGs, and each RG uses a same comb and maximum CS value. Further, the BS 1720 determines a maximum of desired BW for each UE from the UEG. The BS 1720 determines an interference BW for the plurality of UEs 1710.

Further, the BS 1720 orders the plurality of UEs 1710 in the UEG belonging to one TRP unit in a decreasing order of the maximum of their distances to other TRPs. The BS 1720 allocates the plurality of ordered UEs 1710 in the UEG, and starts from a first UE in the ordered group to one comb. The UEs 1710 in the allocation hop across different combs in different OFDM symbols.

Further, the BS 1720 collects the leftover UEs from the UEGs across the TRPs after the allocation and assigning the remaining UEs to the same comb such that UEs of each TRP are allocated a distinct subset of contiguous CS resource values and the CS values of these UEs hop within the subset of CS resource values across different OFDM symbols.

By using the allocated CS, the BS 1720 receives the SRS.

The BS 1720 may perform CS hopping within a subset of the allowable CSs. The subset is formed from the entire allowable CS values. The BS 1720 determines that the CS value for a given port of the UE 1710 at the given OFDM symbol is at an edge of a CS-TRP-R. Further, the BS 1720 mutes or does not transmit the SRS for the port of the UE 1710 at the OFDM symbol. Further, the BS 1720 transfers a transmission power of the port of the UE 1710 to other ports of the same UE upon determining the UE 1710 is a multi-port UE.

The BS 1720 may mute an SRS transmission. The BS 1720 may allocate the CS values for UEs 1710 in different combs and a same OFDM symbol. The BS 1720 may allocate the CS resource for the UE 1710 in a same comb and the OFDM symbol.

The BS 1720 may configure at least one of a number of transmitters and at least one port of a number of transmitters to transmit pilots on at least one of a same frequency and time resources. Further, the BS 1720 may determine a number of transmitters or ports of the transmitters. The BS 1720 computes subcarriers and pilots used in a rectangular grid of pilot subcarriers used for transmission. Further, the BS 1720 computes a pseudo inverse of all-user (e.g. UEs) vectorized basis matrix. Further, the BS 1720 computes a product of a computed pseudo inverse of the all-user vectorized basis matrix and a received vector of values over the pilot subcarriers or the product of a prestored pseudo inverse of the all-user vectorized basis matrix and a received vector of values over the pilot subcarriers to obtain an estimate of all-user basis coefficients vector. The BS 1720 extracts a user basis coefficient vector of each UE from the estimated all-user basis coefficients vector. Further, the BS 1720 determines the estimate of the channel over the rectangular grid of subcarriers for each transmitter based on the user basis coefficient vector and the estimated all-user basis coefficients vector.

The BS 1720 may determines the number of UEs corresponding to the SRS. Based on the determination, the BS 1720 computes the number of SRS subcarriers. The BS 1720 generates the reference sequence matrices corresponding to the UEs using a ZC sequence and a CS value. The reference sequence matrices corresponding to the UE is generated by selecting at least one of the Slepian technique, the polynomial technique, the DFT technique, or any other basis like DCT, oversampled DFT, Karhunen-Loeve, etc.

Further, the BS 1720 monitors the vector value of the reference sequence matrices over at least one SRS subcarrier. The BS 1720 computes the pseudo inverse of concatenated matrix. The BS 1720 computes the predefined SRS vector and one of the computed pseudo inverse of the concatenated basis matrix or a prestored pseudo inverse of the concatenated basis matrix to obtain an estimate of a concatenated basis coefficients vector. The BS 1720 extracts the user basis coefficient vector of each UE from the estimated concatenated basis coefficients vector. Further, the BS 1720 determines the channel estimation for each UE based on the user basis coefficient vector and the estimated concatenated basis coefficients vector.

FIG. 18 illustrates a BS (or a TRP unit), according to an embodiment.

Referring to FIG. 18, the BS includes a processor 1810, a communicator 1820, a memory 1830, and an SRS resource allocation controller 1840. The processor 1810 is coupled with the communicator 1820, the memory 1830, and the SRS resource allocation controller 1840. However, the components of the BS are not limited thereto. For example, the BS may include more or fewer components than those illustrated in FIG. 18.

The SRS resource allocation controller 1840 configures the CS allocation to at least one port of a UE. The CS allocation uses values from the sub-set of the plurality of allowable CS values.

The SRS resource allocation controller 1840 distributes the plurality of allowable CS values into the first sub-set of CS values and the second sub-set of CS values. The first sub-set of CS values is provided as contiguous CS values and the second sub-set of CS resource is provided as different contiguous CS values. Further, the SRS resource allocation controller 1840 assigns the guard band between the sub-sets of CS values. The SRS resource allocation controller 1840 allocates the CSs from each sub-set of CS values to the at least one port of the UE. Allocating the CS values from the subset of CS values may be explicit to all ports of the UE, or allocating the CS values from the subset of CS values, is to all ports of the UE, such that the CS values are equi-distant from one another over the subset of CS values. A UE is served by a TRP assigned to one subset and is served by another TRP assigned to another subset.

The UE may be a single port UE and the CS values assigned to the UE do not hop across the OFDM symbols. The CS allocation to the at least one port of the UE may be configured through an RRC message.

Further, the SRS resource allocation controller 1840 hops the assigned CS values to the at least one port of the UE within the subset. The hopping is across OFDM symbols.

The BS distributes a plurality of allowable CS values into a first sub-set of CS values and a second sub-set of CS values, etc., into many subsets. Each sub-set of CS values may be divided into many subset parts. The number of subset parts is M, and k=cmax/Nap, where cmax is the maximum value of CS or a number of allowable CSs, and where Nap is the number of ports of the UEs that will use the subset. The all subset parts will have equal number of CS values, wherein CS values $a_1$, $a_1$+k, . . . , $a_1$+(Nap−1)*k are in the first subset part, $a_2$, $a_2$+k, . . . , $a_1$+(Nap−1)*k are in the second subset part, . . . , $a_M$, $a_M$+k, . . . , $a_M$+(Nap−1)*k are in the Mth subset part, wherein M is greater than or equal to unity, wherein some or all or none of $a_1$, $a_2$, . . . , $a_M$ are continuous, and wherein the "+" operation is under modulo of cmax. The combination of (cmax,Nap) is (12,4), (12,2), (12,1), (8,8), (8,4), (8,2), (8,1), (6,2), (6,1) . . . . The Nap ports of the UE are assigned values from one subset part of the subset in any OFDM symbol. The subsets and CSs may be configured through RRC, MAC-CE, or DCI.

The CS values of Nap ports of the UE may hop within the same subset part of a given subset across OFDM symbols. The CS values of Nap ports of the UE may all be within one subset part of the given subset in a given OFDM symbol and hop across different subset parts of a given subset across different OFDM symbols. The CS values of Nap ports of the UE may all be within one subset part of the given subset in a given OFDM symbol and hop across different subset parts of different subset across different OFDM symbols.

The BS distributes a plurality of allowable CS values into a first sub-set of CS values and a second sub-set of CS values, etc., into many subsets such that the union of all these subsets is the set of all allowable CS values. The CS values of the at least one port of the UE hop across the OFDM symbols such that all port has a CS value from one subset. Alternatively, the subset has at least one set of Nap CS values that are equidistant in the range of 0, . . . cmax-1, wherein cmax is the maximum number of CS value or maximum number of allowable CS values, wherein Nap is the number of ports of the UE, wherein the CS values of the Nap ports of the UE are assigned from one of such set from the subset, wherein the CS values of the ports of the UE hop within the set across OFDM symbols, and wherein the set can be the same or different across OFDM symbols if the subset has more than one such set.

The CS values assigned to the ports can hop within one or more sets of one or more subsets across OFDM symbols. The CS values of the at least one port of the UE do not hop across the OFDM symbols and each port has a CS value from one subset. The single-port UE obtains the CS values from one subset and hops within the subset across the OFDM symbols. Alternatively, the single-port UE obtains the CS values from one subset and hops among different subsets across the OFDM symbols.

The single-port UE may take CS values from one subset and not hop across the OFDM symbols. For example, consider cmax=12, Nap=2, and allowable CSs from 0-11. Furthermore, subset1=CSs 0,6, subset2=CSs 1,7,2,8, subset3=CSs 3,9,4,10 and subset4=CSs 4,11. In one embodiment, there are four SRS OFDM symbols, and in the first OFDM symbol, CS1,7 are assigned to the two ports of the UE. In the second OFDM symbol, CSs 7,1 are assigned to ports. In the third OFDM symbol, CS1,7 are assigned to the two ports of the UE. In the fourth OFDM symbol, CSs 7,1 are assigned to ports.

In another embodiment, there are four SRS OFDM symbols, and in the first OFDM symbol, CS1,7 are assigned to the two ports of the UE. In the second OFDM symbol, CSs 7,1 are assigned to ports. In the third OFDM symbol, CS2,8 are assigned to the two ports of the UE. In the fourth OFDM symbol, CSs 8,2 are assigned to ports.

In another embodiment, there are four SRS OFDM symbols, and in the first OFDM symbol, CS1,7 are assigned to the two ports of the UE. In the second OFDM symbol, CSs 9,3 are assigned to ports. In the third OFDM symbol, CS2,8 are assigned to the two ports of the UE. In the fourth OFDM symbol, CSs 10,4 are assigned to ports.

The SRS resource allocation controller 1840 defines the plurality of UEs associated with the TRP unit as the UEG. The UEG includes multiple RGs and each RG uses a same comb and maximum CS value. Further, the SRS resource allocation controller 1840 determines the maximum of desired BW for each UE from the UEG. Further, the SRS resource allocation controller 1840 determines an interference BW for the plurality of UEs. The SRS resource allocation controller 1840 orders the plurality of UEs in the UEG belonging to one TRP unit in a decreasing order of the maximum of their distances to other TRPs. The SRS resource allocation controller 1840 allocates the plurality of ordered UEs in the UEG, and starts from the first UE in the ordered group to one comb. The UEs in the allocation hop across different combs in different OFDM symbols.

Further, the SRS resource allocation controller 1840 collects the leftover UEs from the UEGs across the TRPs after the allocation and assigning the remaining UEs to the same comb such that UEs of each TRP are allocated a distinct subset of contiguous CS resource values and the CS values of these UEs hop within the subset of CS resource values across different OFDM symbols.

By using the allocated CS, the SRS resource allocation controller 1840 receives the SRS.

The SRS resource allocation controller 1840 performs the CS hopping within a subset of the allowable CSs. The subset is provided over the entire allowable CS values. The SRS resource allocation controller 1840 determines that the CS value for the given port of the UE at the given OFDM symbol is at the edge of the CS-TRP-R. Further, the SRS resource allocation controller 1840 mutes or does not transmit the SRS for the port of the UE at the OFDM symbol. The SRS resource allocation controller 1840 transfers the transmission power of the port of the UE to other ports of the same UE, upon determining the UE is a multi-port UE.

The SRS resource allocation controller 1840 mutes an SRS transmission. Alternatively, the SRS resource allocation controller 1840 allocates the CS values for UEs in different combs and a same OFDM symbol. The SRS resource allocation controller 1840 allocates the CS resource for the UE in a same comb and an OFDM symbol.

The pilot receiver 1850 configures at least one of the number of transmitters and at least one port of the number of transmitters to transmit pilots on at least one of a same frequency and time resources. The pilot receiver 1850 determines the number of transmitters or ports of the transmitters. The pilot receiver 1850 computes the subcarriers and pilots used in the rectangular grid of pilot subcarriers used for transmission. The pilot receiver 1850 computes the pseudo inverse of all-UEs vectorized basis matrix. The pilot receiver 1850 computes the product of the computed pseudo inverse of the all-user vectorized basis matrix and the received vector of values over the pilot subcarriers or the product of the prestored pseudo inverse of the all-user vectorized basis matrix and the received vector of values over the pilot subcarriers to obtain an estimate of all-user basis coefficients vector. The pilot receiver 1850 extracts the user basis coefficient vector of each UE from the estimated all-user basis coefficients vector. Further, the pilot receiver 1850 determines the estimate of the channel over the rectangular grid of subcarriers for each transmitter based on the user basis coefficient vector and the estimated all-user basis coefficients vector.

At least one of the configured number of transmitters and the at least one port of the transmitters transmit the pilots on the configured time and frequency resources such that indices of an mg-vector used as exponential complex sequences of the various transmitters and/or ports of the transmitters in a frequency domain are a, a-2b, and a-4b, where a is 0, an integer, a fraction, or a fraction plus an integer, and b is the perceived bandwidth of the channel in the frequency domain by the receiver.

The indices of the mg-vector used as exponential complex sequences of the various transmitters and/or ports of the transmitters in the time domain are a, a-2b, and a-4b, where a is 0, an integer, a fraction, or a fraction plus an integer, and b is the perceived bandwidth of the channel in the time domain by the receiver. The perceived bandwidth of the channel in both frequency and time domains is based on channel estimation module of the receiver.

The all-user vectorized basis matrix may be generated by using one of a Slepian sequence, a polynomial sequence, and a DFT based sequence.

The pilot receiver 1850 determines the number of UEs corresponding to the SRS. Based on the determination, the pilot receiver 1850 computes the number of SRS subcarriers. The pilot receiver 1850 generates the reference sequence matrices corresponding to the UEs using the ZC sequence and the CS value. The reference sequence matrices corresponding to the UE are generated by selecting at least one of the Slepian technique, the polynomial technique, the DFT technique, or any other basis like DCT, oversampled DFT, Karhunen-Loeve, etc.

Further, the pilot receiver 1850 monitors the vector value of the reference sequence matrices over at least one SRS subcarrier. The pilot receiver 1850 computes the pseudo inverse of concatenated matrix. The pilot receiver 1850 computes the predefined SRS vector and one of the computed pseudo inverse of the concatenated basis matrix or a prestored pseudo inverse of the concatenated basis matrix to obtain an estimate of a concatenated basis coefficients vector. The pilot receiver 1850 extracts the user basis coefficient vector of each UE from the estimated concatenated basis coefficients vector. The pilot receiver 1850 determines the channel estimation for each UE based on the user basis coefficient vector and the estimated concatenated basis coefficients vector.

The SRS resource allocation controller 1840 may be implemented by analog and/or digital circuits such as logic gates, integrated circuits, microprocessors, microcontrollers, memory circuits, passive electronic components, active electronic components, optical components, hardwired circuits, etc., and may optionally be driven by firmware.

The pilot receiver 1850 may be implemented by analog and/or digital circuits such as logic gates, integrated circuits, microprocessors, microcontrollers, memory circuits, passive electronic components, active electronic components, optical components, hardwired circuits, etc., and may optionally be driven by firmware.

The processor 1810 may include one or a plurality of processors. The one or the plurality of processors may include a general-purpose processor, such as a central processing unit (CPU), an application processor (AP), etc., a graphics-only processing unit such as a graphics processing unit (GPU), a visual processing unit (VPU), and/or an AI-dedicated processor such as a neural processing unit (NPU). The processor 1810 may include multiple cores and is configured to execute the instructions stored in the memory 1820.

The processor 1810 may be configured to execute instructions stored in the memory 1830 and to perform various processes.

The communicator 1820 may be configured for communicating internally between internal hardware components and with external devices via one or more networks.

The memory 1830 may store instructions to be executed by the processor 1810. The memory 1830 may include non-volatile storage elements, e.g., magnetic hard discs, optical discs, floppy discs, flash memories, or forms of electrically programmable memories (EPROM) or electrically erasable and programmable (EEPROM) memories. In addition, the memory 1830 may be considered a non-transitory storage medium. The term "non-transitory" may indicate that the storage medium is not embodied in a carrier wave or a propagated signal. However, the term "non-transitory" should not be interpreted as meaning the memory 1830 is non-movable. A non-transitory storage medium may store data that can, over time, change (e.g., in RAM or cache).

Although the FIG. 18 illustrates various hardware components of the BS, other embodiments are not limited thereto. For example, the BS may include fewer or more components. Further, the labels or names of the components are used only for illustrative purpose and do not limit the scope of the disclosure. One or more components can be combined together to perform same or substantially similar function in the BS. The BS may also include an SRS receiver to receive pilots like SRS/DMRS or any set of pilots over a rectangular time—frequency grid or OTFS receiver.

FIG. 19 is a flow chart illustrating a method for managing SRS CS resource allocation in a wireless network, according to an embodiments.

Referring to FIG. 19, in step 1902, a BS configures the CS allocation to at least one port of at least one UE. The CS allocation uses values from the sub-set of the plurality of allowable CS values and the CSs allocated to the at least one ports of at least one UE hop within the subset of CS values for various OFDM symbols.

In step 1904, the BS receives an SRS using the allocated CS.

FIG. 20 is a flow chart illustrating a method for channel estimation in a wireless network, according to an embodiment.

Referring to FIG. 20, in step 2002, a BS configures the at least one of the number of transmitters and at least one port of the number of transmitters to transmit pilots on at least one of a same frequency and time resources.

In step 2004, the BS determines the number of transmitters or ports of the transmitters.

In step 2006, the BS computes the subcarriers and pilots used in the rectangular grid of pilot subcarriers used for transmission.

In step 2008, the BS computes the pseudo inverse of all-user vectorized basis matrix.

In step 2010, the BS computes the product of the computed pseudo inverse of the all-user vectorized basis matrix and the received vector of values over the pilot subcarriers or the product of the prestored pseudo inverse of the all-user vectorized basis matrix and the received vector of values over the pilot subcarriers to obtain an estimate of all-user basis coefficients vector.

In step 2012, the BS extracts the user basis coefficient vector of each UE from the estimated all-user basis coefficients vector.

In step 2014, the BS determines the estimate of the channel over the rectangular grid of subcarriers for each transmitter based on the user basis coefficient vector and the estimated all-user basis coefficients vector FIG. 21 is a flow chart illustrating a method for channel estimation in a wireless network, according to an embodiment.

Referring to FIG. 21, in step 2102, a BS determines the number of UEs corresponding to the SRS.

In step 2104, the BS computes the number of SRS subcarriers based on the determination.

In step 2106, the BS generates the reference sequence matrices corresponding to the number of UEs using the ZC sequence and the CS value for each UE.

In step 2108, the BS monitors the vector value of the reference sequence matrices over at least one SRS subcarrier. In step 2110, the BS computes the pseudo inverse of concatenated basis matrix. In step 2112, the BS computes a product of the computed pseudo inverse of the concatenated basis matrix and SRS vector of received SRS values or a product of a prestored pseudo inverse of the concatenated basis matrix and SRS vector of received SRS values to obtain an estimate of a concatenated basis coefficients vector.

In step 2114, the BS extracts the user basis coefficient vector of each UE from the estimated concatenated basis coefficients vector.

In step 2116, the BS determines the channel estimation for each UE based on the user basis coefficient vector and the estimated concatenated basis coefficients vector.

FIG. 22 illustrates a method of CS allocation, according to an embodiment.

Referring to FIG. 22, per-port CS allocation gives flexibility of using the CS resources efficiently to minimize inter-TRP interference.

FIG. 23 illustrates a method of CS allocation, according to an embodiment.

Referring to FIG. 23, if another TRP's UEs need to be decoded by a given TRP, further processing should be done. A first TRP estimates the channel of its own UEs, and then from its received signal it cancels out the estimate of the received signal of its own UEs. This signal can be called an RSOUE. This process may be called first interference cancellation. The first TRP then estimates the channels of UEs from the other TRPs using the RSOUE. Assuming that timing offsets of two UEs from other TRP to the desired TRP is $t_1$ and $t_2$, and the channel of both these UEs overlap as $t_1$ and $t_2$ are both greater than zero, the TRP multiplies RSOUE by $e^{j2\pi f_k a}$, where $a=t_2$ (assume $t_1>t_2$) so that the dispersion of the channels of the UEs of other TRPs as seen by the desired TRP is reduced. More importantly, both channels now do not overlap and can be estimated. The estimated channels are then multiplied by $e^{-j2\pi f_k a}$ to get the desired channel estimates, where a can be a general value used for any sets of UEs from interfering/other TRP's channel estimation at desired/own TRP.

In another embodiment, let there be x UEs per TRP, two TRPs. The FFT BW of the UE as seen by its own TRP be a and as seen by the other TRP be b. If the UEs should not interfere with each other and as per legacy equi-distant CSs are allocated, then the total BW is $L_{BW}=xa+xb<=c_{max}$.

Where per-port CS is configured, the total BW is $P_{BW}=2xa+2(b-a)<=c_{max}$. Note that $L_{BW}-P_{BW}>0$ as $L_{BW}-$ $P_{BW}$=(x−2)(b−a) and x>2, b>a. Hence the proposed method efficiently utilizes the resources.

FIG. 24 is a graph illustrating capacity improvement of a receiver.

Referring to FIG. 24, capacity improvement is also one of the objectives for SRS [Reference: RP-213591, "New WID: MIMO Evolution for Downlink and Uplink]. The number of UEs using same time-frequency resources is a function of delay spread of a channel. In existing standards, the number of UEs is a function of a combsize or kTC. If kTC=2, there are four UEs. As per the existing standards, there can be only four UEs, but an advanced receiver can accommodate 6 UEs, so there should be a provision in standards to do so as shown in the FIG. 24.

For kTC=2, (combsize) $c_{max}$ (max CS) is 8, but 6 UEs cannot be evenly distributed among the CSs when the maximum CS is 8. Without even distribution of CSs there is performance loss. Accordingly, max CS $c_{max}$ should also be configurable. Therefore, there should also be a mechanism, e.g., via an RRC message, to configure a value of max CS, independent of kTC.

FIG. 25 illustrates allocation of a CS to UEs, according to an embodiment.

Referring to FIG. 25, the technique include allocating all UEs of the TRP in contiguous fashion followed by a gap, followed by all UEs of another TRP etc., followed by another gap, etc., until all CSs are exhausted.

FIG. 26 illustrates allocation of a CS to UEs, according to an embodiment.

Referring to FIG. 26, the CS domain is broken into many regions. Each two regions are separated by a guard band, that can optionally be of zero CS values. The regions (TRP1 and TRP2) are allocated to UEs of TRP1 and TRP2 respectively. The CS allocation of per-port configuration can also be done as follows. The method allocates TRP1 to the UEs belonging to TRP1 and TRP2 to UEs belonging to TRP2. For example, this can be done via the RRC message. Within each region, equi-distant allocation is possible to ports of the UE. Only starting is signaled. The region wraps around if needed. The UE of the network can set a starting position and increment to cover all ports of the UE.

The following techniques may be performed for resource assignment:

a) Define all UEs associated with the TRP as a UEG.

b) A UEG can have many RGs.

c) Each RG uses the same comb, same $c_{max}$.

d) Determine a maximum of desired BW for each UEG.

e) Determine interference BW of all UEs.

f) Arrange UEs in an UEG in decreasing order of their distances to other TRP.

g) Allocate all UEs in an UEG (e.g., give preference to the ones with maximum distance to other TRPs) to one comb such that difference in CSs between two UEs is less than maximum of desired BW of UEs in that comb. Repeat this process for all UEGs. Use appropriate comb length or $C_{max}$.

h) For leftover UEs of UEGs of different TRPs, the method can accommodate them in a same comb with appropriate guard band. Such a comb is called a mixed-comb. This comb will have UEs belonging to other TRPs.

i) In a mixed comb, the guard band can be less than half of the difference between interference BW and desired BW. In such a case, the method includes CS hopping and/or comb hopping to reduce interference.

j) For CS hopping, some, all, or only the edge UEs' CSs are hopped among themselves.

k) For comb hopping, an RG is hopped in a comb or hopped across all combs to reduce interference.

l) The above algorithm is at instant of one time. The algorithm can run for various time instances to multiplex many UEGs/UEs in time as well.

Further, conventional SRS receivers are based on Fourier basis, similar to what is depicted in [DMRS Design and Channel Estimation for LTE-Advanced MIMO Uplink" *IEEE* 2009 *Vehicular Technology Conference*]. Conventional receivers based on Fourier basis exhibit the Gibbs problem. However, a good basis can approximate a channel with less error and fewer basis coefficients. Accordingly, Fourier basis is not the best in this case. For example, better basis exists, like polynomial or Slepian.

Let y be an N×1 observation SRS vector (values observed over N SRS subcarriers or SRS REs). Let us consider an N×E basis matrix ϕ and an E×1 basis coefficient vector x. The UE of the BS may approximate the observed channel vector y as follows.

Fourier and Slepian

E=N and y=ϕx.

Note that ϕ is a unitary matrix, i.e., $\phi^H\phi$=I an Identity matrix, and x is estimated as x=$\phi^H$y.

Polynomial

E<N and y=ϕx.

Here, ϕ is not a unitary matrix. x is estimated as x=$(\phi^H\phi)^{-1}\phi^H$y. For example, if y is a 24×1 vector, E can not be greater than 6 to ensure good condition number of $(\phi^H\phi)^{-1}$.

$$\phi_M^{(R)}$$

indicates the first R columns of ϕ and subscript M denotes F, P, S (Fourier, Slepian, and Polynomial basis).

Likewise, $$x_M^{(R)}$$

indicates the first R elements of x and subscript M denotes F, P, S (Fourier, Slepian, and Polynomial basis).

A channel reconstruction error for each of the basis (Fourier, Polynomial, and Slepian) may be define d as shown in Equation (1).

$$\rho_F^{(R_F)} = \|y - \Phi_F^{(R_F)} x_F^{(R_F)}\|^2, \quad \rho_P^{(R_P)} = \|y - \Phi_P^{(R_P)} x_P^{(R_P)}\|^2, \rho_S^{(R_S)} = \left\|y - \Phi_S^{(R_S)} x_S^{(S)}\right\|^2 \tag{1}$$

As will be described below, a UE of a BS needs more basis coefficients at a higher reconstruction error for the Fourier basis than the polynomial and Slepian basis. The UE of the BS has $$\rho_S^{(R_S)} < \rho_P^{(R_P)} < \rho_F^{(R_F)}$$

for $R_S<R_P<R_F$.

The quantity R ($R_S<R_P<R_F$) may be important in other ways as well. A small value may help in capacity improvement. If $N_U$ UEs are using the same time-frequency SRS REEs, $N_U R \leq N$. Accordingly, if complexity is same as Fourier basis, other basis can be considered for performance/capacity improvements.

For Fourier and Slepian basis $\|y\|^2=\|x\|^2$, since $\phi$ is a unitary matrix. For polynomial basis, $\|y\|^2 \sim \|x\|^2$ since $\phi$ is not a unitary matrix.

For good modelling of the channel, the UE of the BS may want $\|x^{(R)}\|^2 \sim \|x\|^2$ for small values of R. Also, for capacity improvement, smaller values of R may be preferred, as the UE has $N_U R \leq N$.

Hence, the UE defines a quantity $$\beta^{(R)} = \frac{\|x^{(R)}\|^2}{\|x\|^2}.$$

If $\beta^{(R)}$ reaches 1 for small values of R, it is a good choice for basis.

In summary, the following two are important for a basis.

a) $\beta^{(R)}$ reaches 1 for small values of R.

b)

$$\rho_M^{(R)}$$

is small for smaller values of R.

Basis matrix $\phi$ a) Fourier—The (i,j)th element is given by $$\phi(i, j) = e^{-\frac{j2\pi ij}{N}},$$

$0 \leq i,j \leq N-1$.

b) Polynomial—The (i,j)th element is given by $\phi(i,j)=(i+1)^j$, $0 \leq i,j \leq N-1$.

c) Slepian—The Slepian sequences are characterized by $\mu$, which is a time-half bandwidth product.

Slepian Methods: Slepian sequences have the least amount of leakage among all sequences based Tables 1 and 2 below.

TABLE 1

The relationship between a discrete signal $x \in \ell_2(\mathbb{Z})$ and its discrete time Fourier transform $$(DTFT)\tilde{x} \in L_2\left(\left[-\frac{1}{2}, \frac{1}{2}\right]\right)$$

is given by $$\tilde{x}(f) = \sum_{n=-\infty}^{\infty} x[n]e^{-j2\pi fn},$$

$$x[n] = \int_{-1/2}^{1/2} \tilde{x}(f)e^{j2\pi fn}\, df.$$

For a given positive integer N and bandlimit $$0 < W < \frac{1}{2},$$

the only signal which is both bandlimited to $f \in [-W, W]$ and timelimited to $n \in \{0, 1, \ldots, N-1\}$ is the zero signal.
Can we find timelimited signals whose energy is maximally concentrated in the frequency interval $[-W, W]$?

TABLE 2

For any length N signal, $x \in \mathbb{C}^N$, $$\frac{\int_{-W}^{W} |\tilde{x}(f)|^2 df}{\int_{-1/2}^{1/2} |\tilde{x}(f)|^2 df} = \frac{x^* B_{N,W} x}{x^* x},$$

where $B_{N,W}$ is an $N \times N$ matrix with entries $$B_{N,W}[m, n] = \begin{cases} \frac{\sin(2\pi W(m-n))}{\pi(m-n)} & \text{if } m \neq n \\ 2W & \text{if } m = n \end{cases}.$$

The Slepian basis vectors $s_{N,W}^{(0)}, s_{N,W}^{(1)}, \ldots, s_{N,W}^{(N-1)}$ are defined as the eigenvectors of $B_{N,W}$, where the respective eigenvalues $\lambda_{N,W}^{(0)}, \lambda_{N,W}^{(1)}, \ldots, \lambda_{N,W}^{(N-1)}$ are sorted in decreasing order [1].

Slepian (DPSS) Basis a) $\varphi$ is an N×N matrix (N orthogonal columns) that can be generated by matlab dpss(N, thbw, N) function. Generates N (third parameter) sequences of length N (first parameter). thbw called as time_halfbandwidth.

FIG. 27 is a graph illustrating Gibbs phenomenon.

Referring to FIG. 27, Fourier basis means there is more error at edges, which is referred to as Gibbs phenomenon. No such problem exists for Slepain and Polynomial basis.

FIGS. 28 to 30 are graphs illustrating metrics comparisons, according to embodiments.

Referring to FIGS. 28 to 30, for a given R, $\rho^{(R)}$ for Slepain and polynomial are less than Fourier basis. For a given $\rho^{(R)}$, R for Slepain and polynomial are less than Fourier basis. $\beta^{(R)}$ reaches faster for Slepian and polynomial than Fourier basis.

FIGS. 31 and 32 are graphs illustrating performance comparisons, according to an embodiment.

Proposed Receiver: Channel estimation for $N_U$ SRS UEs using same time-frequency resources. Let the channel vector of the $i^{th}$ UE be denoted by the N×1 vector in Equation (2).

$$h_i = \phi_M^{(R)} x_M^{(R,i)} \tag{2}$$

In Equation (2), $$\phi_M^{(R)}$$

is the basis matrix, subscript M denotes the choice of method, and basis coefficient vector $$x_M^{(R)}$$

for the $i^{th}$ UE is denoted by $$x_M^{(R,i)},$$

called as $i^{th}$ UE basis coefficient vector.

Denote a concatenated basis matrix as $$A = \left[r_1 \phi_M^{(R)} \ \ldots \ r_{N_U} \phi_M^{(R)}\right] x_{all},$$

where $x_{all}$ is a concatenation of basis coefficient vectors of all UEs, called as concatenated basis coefficient vector, as $$x_{all} = \begin{bmatrix} x_M^{(R,1)} \\ \vdots \\ x_M^{(R,N_U)} \end{bmatrix},$$

where $r_i$ is N×N diagonal matrix with reference sequence (ZC sequence and CS exponential) of the $i^{th}$ UE along the diagonal, called as an ith-user reference sequence matrix.

Normally, the ZC component in $r_1, \ldots, r_{NU}$ is the same. Here, z is a diagonal matrix with ZC sequence on the diagonal. Denote $\overline{A}=z^H A$ and $\overline{y}=z^H y$. Note that the $r_1, \ldots, r_{NU}$ in A, if constructed without a ZC sequence and only with exponential CSs, becomes $\overline{A}$.

In the receiver, the UE have $y=Ax_{all}$ and estimate $x_{all}$ as $\hat{x}_{all}=(A^H A)^{-1} A^H y$. If the ZC component is the same in all UEs, then $\overline{y}=\overline{A}x_{all}$ and $=(\overline{A}^H \overline{A})^{-1} \overline{A}^H y$.

From $\hat{x}_{all}$, the method can be used to compute and estimate $$\hat{x}_M^{(R,i)}$$

and $$\hat{h}_i = \phi_M^{(R)} \hat{x}_M^{(R,i)}.$$

Complexity a) Consider a maximum CS of eight and four UEs.

b) Case 1: CS=0,2,4,6.

c) Case 2: CS=1,3,5,7.

d) The method assumes equi-distant CSs though it need not be as long as the differences between CSs are the same.

e) Let $A_{case1}$ and $A_{case2}$ be the A matrices for Case 1 and Case 2 above.

f) The method can observe that $$\left(A_{case\,1}^H A_{case\,1}\right)^{-1} \left(A_{case\,2}^H A_{case\,2}\right)^{-1}$$

are the same and can be pre-computed and stored, and furthermore not dependent on the ZC sequence.

g) $A_{case2}=DA_{case1}$, where D is a diagonal matrix with an exponential sequence corresponding to CS difference (in this case unity).

h) $A_{case1}$ can be precomputed and D can be computed.

i) The method can be easily implemented. Similar analysis holds for $\overline{A}$.

The method can be used to extend to any Rx of any channel, not just SRS receivers. The method can be used for a physical downlink shared channel (PDSCH) receiver/physical uplink shared channel (PUSCH) receiver as well. The basis matrix $$\phi_M^{(R)}$$

can be from any basis like Slepian, polynomial, DFT, oversampled DFT, DCT, Karhunen-Loeve or any other basis.

FIG. 33 illustrates allowable CSs broken in to two subsets and CS values associated with ports being hopped within a subset across OFDM symbols, according to an embodiment.

Referring to FIG. 33, UEs for each TRP may be given contiguous non-overlapping region of CSs, e.g., CS-TRP-region (or CS-TRP-R). Only the UEs associated with a CS that is at the right-edge of the CS-TRP-R experiences interference form UEs of other TRPs. The UEs associated with the CSs that are not at the right-edge of the CS-TRP-R and do not experience interference form UEs of other TRPs. In FIG. 33, the blocks without highlights represents UEs with the CSs having no interference from other TRPs. The highlighted blocks are the edge of CS-TRP-R.

FIG. 34 illustrates allowable CSs broken in to two subsets and CS values associated with ports being hopped and muted within a subset across OFDM symbols, according to an embodiment.

Referring to FIG. 34, the CSs of UEs are hopped within the CS-TRP-R. This way all UEs share the interference equally. When a user's CS is at the edge of CS-TRP-R, it is muted and not transmitted in that OFDM symbol. This way performance almost reaches the case of single TRP (no interference from mTRP) and almost all interference is removed.

Each TRP has two UEs. The CS of UE in desired TRP is denoted as $d_1$ and $d_2$. CS of UEs in an interfering TRP is denoted as $i_1$,$i_2$. The signals of UEs from interfering TRPs travel an extra propagation distance of 300 m as shown in Tables 3 to 7 below.

TABLE 3

| Sl. No. | Parameters | Value |
|---|---|---|
| 1. | kTC | 4 |
| 2. | Channel | CDL-C |
| 3. | Delay spread | 100 ns |
| 4. | Subcarrier spacing | 30 kHz |

TABLE 4

| CS allocation for Legacy scheme | | | | | | | | |
|---|---|---|---|---|---|---|---|---|
| SRS Sym | Legacy CS allocation (no hopping) | | | | Legacy CS allocation (hopping) | | | |
| in slot | $d_1$ | $d_2$ | $i_1$ | $i_2$ | $d_1$ | $d_2$ | $i_1$ | $i_2$ |
| 11 | 0 | 6 | 3 | 9 | 0 | 6 | 3 | 9 |
| 12 | 0 | 6 | 3 | 9 | 0 | 6 | 9 | 3 |
| 13 | 0 | 6 | 3 | 9 | 6 | 0 | 3 | 9 |
| 14 | 0 | 6 | 3 | 9 | 6 | 0 | 9 | 3 |

TABLE 5

| Proposed per-port scheme | | | | | | | | |
|---|---|---|---|---|---|---|---|---|
| SRS Sym | Proposed per-port CS allocation (no hopping) | | | | Proposed per port CS allocation (hopping) | | | |
| in slot | $d_1$ | $d_2$ | $i_1$ | $i_2$ | $d_1$ | $d_2$ | $i_1$ | $i_2$ |
| 11 | 0 | 3 | 6 | 9 | 0 | 3 | 6 | 9 |
| 12 | 0 | 3 | 6 | 9 | 0 | 3 | 9 | 6 |
| 13 | 0 | 3 | 6 | 9 | 3 | 0 | 6 | 9 |
| 14 | 0 | 3 | 6 | 9 | 3 | 0 | 9 | 6 |

TABLE 6

| Proposed per-port scheme | | | | |
|---|---|---|---|---|
| SRS Sym | Proposed per port CS allocation (hopping and muting) | | | |
| in slot | $d_1$ | $d_2$ | $i_1$ | $i_2$ |
| 11 | 0 | No SRS | 6 | No SRS |
| 12 | 0 | No SRS | No SRS | 6 |
| 13 | No SRS | 0 | 6 | No SRS |
| 14 | No SRS | 0 | No SRS | 6 |

TABLE 7

| Results | |
|---|---|
| Scheme | |
| | tArea |
| Legacy CS | cyclic shifts for TRP1 |
| Per-port-CS | cyclic shifts for TRP2 |
| | Shape |
| No Hopping | SOLID line |
| Hopping | BROKEN line |

Table 4 above, the legacy CS allocation (hopping) is an example of CS values assigned to ports of a UE and the CS values are taken from a subset of allowable CS values and hop across OFDM symbols. Although one hopping pattern is provided as an example, other hopping patterns are also possible.

The table below in Table 7 may be a description of FIGS. 35 to 37 below. Per-port CS hopping and muting can be thought of as simple time-division multiplexing (TDM) as follows.

Consider four UEs to share 12 CSs in each of the four OFDM symbols, which causes interference to half of the UEs in any OFDM symbol. For example, $d_1$=0, $d_2$=3, $i_1$=3, and $i_2$=6. The $d_2$ and $i_2$ have interference. Each UE has power P. Accordingly, only $d_1$=0 and $i_1$=6 are there with Power 2P in the first two OFDM symbols and $d_2$=0 and $i_2$=6 with power 2P in next two OFDM symbol, thereby avoiding interference completely as CSs are separated by six units. The reduced processing gain due to each UE being present in only half the OFDM symbols is well compensated by increasing the power to twice the usual. This is an alternate perspective of per-port-CS with hopping and muting. Note that TD-OCC schemes (if any) will fail due to muting/dropping of SRS in one of the OFDM symbols.

Only the UEs whose CSs are at right edges of CS-TRP-R are muted. At the left-edge of CS-TRP-R are muted and can mute at both edges of CS-TRP-R as well.

kTC can be independently configured. Maximum CSs can also be independently configured (i.e., need not be dependent on kTC as per existing standard). Fixed or random hopping patterns may be used. A random hopping pattern can be based on a pseudo random sequence, a network configured identifier (ID) with UE specific implementation, etc. Different UEs can also indicate different antenna ports of a single UE and vice-versa.

In FIG. 34, only the UEs associated with a CSs that is at the right-edge of the CS-TRP-R experiences interference form UEs of other TRPs. The UEs associated with a CS that is not at the right-edge of the CS-TRP-R do not experience interference from UEs of other TRPs.

FIGS. 35 to 37 are graphs illustrating performance comparisons of CS resource allocation according to an embodiment with legacy CS resource allocation methods.

Referring to FIGS. 35 to 37, muting means as a CS is hopped for a UE across OFDM symbol, it is dropped or not transmitted in the OFDM symbols where the CS is at edge of CS-TRP-R. Muting need not be implemented, however, as the gNB can chose to ignore the SRS in such cases. However, by muting, the extra power is transferred to other UEs which improves performance. In FIG. 37, per-port-CS with hopping improves the performance. The per-port-CS with hopping and muting improves the performance further and achieves the lower bound of single TRP (no interference case).

FIG. 38 illustrates a method of forming subsets from a set of allowable CS values, according to an embodiment.

Referring to FIG. 38, hopping and legacy-CS is better than legacy-CS with no hopping. Further, hopping and per-port-CS is better than per-port-CS with no hopping. The hopping always improves performance, independent of legacy-CS or per-port-CS.

Per-port-CS with hopping and muting almost achieves a lower bound of single-TRP and no-interference case.

ZC Sequence, CSs, and Exponential Sequences $$r_i=\bar{z}_i \odot e_i \tag{3}$$

In Equation (3), $\odot$ is the Hadamard product or element-wise multiplication operation, $\bar{z}_i$ is the N×1 Zadoff chu sequence vector, and $e_i$ is the exponential complex sequence vector given by Equation (4).

$$e_i = \begin{bmatrix} 1 \\ e^{j2\pi\alpha_i} \\ \vdots \\ e^{j2\pi\alpha_i(N-1)} \end{bmatrix} \tag{4}$$

In Equation (4), $$\alpha_i = 2\pi \frac{n_{SRS}^{CS,i}}{n_{SRS}^{CS,max}}.$$

Here, $$n_{SRS}^{CS,i}$$

is referred to as the CS, although the 3GPP standards refers to $\alpha_i$ as the CS. The UE uses $$n_{SRS}^{CS,max}$$

as N. Note that, $$n_{SRS}^{CS,max}$$

is referred to as a maximum CS or maximum number of allowable CSs.

Timing Offset Compensation

If there is a timing offset $\tau$ (this can be different for different UEs but same for all ports. If UEs are involved, the UE uses one value, either the maximum or a value in the middle for all possible UEs).

The kth RE (resource element) will undergo a phase change due this, which is $e^{-j2\pi k\Delta f\tau}$, where $\Delta f$ is the subcarrier spacing. A compensating timing offset vector $t_{TO}$ is constructed as shown in Equation (5).

$$t_{TO} = \begin{bmatrix} 1 \\ e^{j2\pi K_{TC}\Delta f\tau} \\ \vdots \\ e^{j2\pi K_{TC}(N-1)\Delta f\tau} \end{bmatrix} \tag{5}$$

The received signal vector y is pre-compensated as $y=\text{diag}(t_{TO})y$ as a first step before further processing in the SRS receiver. Diag(x) is a diagonal matrix with vector x along the main diagonal.

Slepian Sequence—Time Half Bandwidth Product

Consider a discrete signal x[n], n=0, . . . , N−1 and let its discrete-time Fourier transform (DTFT) be denoted by Equation (6).

$$X(f) = \frac{1}{N}\sum_{n=0}^{N-1} x[n]e^{-j2\pi fn} \tag{6}$$

In Equation (6), $$x[n] = \int_{g-\epsilon}^{g+\epsilon} X(f)e^{j2\pi fn}\,df.$$

That is, the signal is bandlimited between $g-\epsilon$ and $g+\epsilon$. In such a case, the UE can say that x[n] lies in a subspace spanned by $2N\epsilon$ Slepian (discrete prolate spheroidal sequences) basis, each of which is modulated by $e^{j2\pi gn}$ for various n.

Consider many multipaths, the earlies being $t_1$ and the last being $t_2$. The channel for the kth SRS subcarrier of the N SRS subcarriers is given by (for simplicity assume kTC=1) Equation (7).

$$H(k) = \sum_{\tau=t_1}^{\tau=t_2} h_\tau e^{-j2\pi k\Delta f\tau},\ k = 0, \ldots, N-1 \tag{7}$$

In Equation (7), $\Delta f$ is subcarrier spacing and the signal H(k) is bandlimited between $-\Delta ft_1=g-\epsilon$ and $-\Delta ft_2=g+\epsilon$. Define $$g = \frac{-\Delta ft_1 - \Delta ft_2}{2},\ \epsilon = \frac{\Delta ft_1 - \Delta ft_2}{2},\ m_g = \begin{bmatrix} 1 \\ e^{-j2\pi g} \\ \vdots \\ e^{-j2\pi g(N-1)} \end{bmatrix},$$

m is a diagonal matrix with $m_g$ along main diagonal, $h=[H(0)\ \ldots\ H(N-1)]^T$. Then, mh lies in a subspace of Slepian basis of dimension $2N\epsilon$. The time half bandwidth product is $N\epsilon$, and the parameter NW in matlab function dpss. Here, $m_g$ is called as the mg-vector and g is the index of the mg-vector.

Perceived Bandwidth

The channel H(k) Has a bandwidth $B=2\epsilon$. If the method takes the DTFT of H(k), the perceived BW (PBW) $B_P$ will be greater than $2\epsilon$, e.g., $B_P=2\bar{\epsilon}$. This is because of the windowing effect and finite size N. As N increases, $B_P \cong B$, but for small N, $B_P>B$. The number of multiusers, such that the DTFTs do not overlap (the method uses CSs or exponential sequences to shift and ensure DTFTs of UEs do not overlap) is therefore $$N_U = \frac{1}{B_P}.$$

Ideally, $$N_U = \frac{1}{B_P}.$$

By definition the N-length Slepian sequences are sequences with most energy concentration in the frequency region $-\epsilon$ to $\epsilon$. Accordingly, by projecting h on to the Slepian basis, the projected vector will have a $B_P$ very close to B and achieve $$N_U = \frac{1}{B}.$$

Alternatively, the method knows from preceding discussion that $R_S<R_F$ and $R_S=2N\epsilon$, so for Slepian basis, $N_U$ may be determined as in Equation (8).

$$N_U = \frac{N}{R_S} = \frac{N}{2N\epsilon} = \frac{1}{2\epsilon} \tag{8}$$

In any basis, the estimate of h may be obtained by projecting h to that basis. For Slepian basis, each of the basis has a $B_P \cong B$ and so the estimate of h also has $B_P \cong B$.

CSs and Timing Offset Compensation

Assume, for simplicity that g, $\bar{\epsilon}$ are the same for all UEs. The timing offset compensation and assignment of CSs for exponential complex sequences should be such that the DTFT of all UEs should be non-overlapping and separated by $2\bar{\epsilon}$. This can be assigned in one of the three ways below.

$t_{TO}=M_g$ and CSs such that the exponential complex sequence of UEs are $m_0$, $m_{-2\bar{\epsilon}}$, $m-_{4\bar{\epsilon}}$, so on.

No timing offset compensation and CSs such that the exponential complex sequence of all UEs are $m_0$, $m_{-2\bar{\epsilon}}$, $m_{-4\bar{\epsilon}}$, etc.

No timing offset compensation and CSs such that the exponential complex sequence of all UEs are $m_{a+0}$, $m_{a-2\bar{\epsilon}}$, $m_{a-4\bar{\epsilon}}$, etc. Here, a can be an integer or a fraction or integer and fraction. For fractions, it is extracted from columns of an oversampled DFT matrix.

Herein, $$\bar{\epsilon}$$

in can be the smallest integer greater than or equal to half the perceived bandwidth.

FIGS. 39 and FIG. 40 are graphs illustrating Slepian sequence—time half bandwidth products, according to an embodiment.

Referring to FIGS. 39 and 40, 13 sinusoids or exponentials are generated and summed up to generate N length sequence. The sinusoids are selected from range $$-\frac{A}{N} \text{ to } \frac{A}{N}.$$

Therefore, expected $R_s=2A$.

FIGS. 39 and 40 illustrates that if a signal of N samples is bandlimited between x and −x, then the signal lies in a subspace spanned by 2NX Slepian basis.

FIGS. 41 and 42 are graphs illustrating $R_F$ and $R_S$, according to an embodiment.

Referring to FIGS. 41 and 42, the parameters used are $\Delta f=15e3$, $t_1=0$, $t_2=864$ ns, and N=12. The graphs show how the SRS channel in frequency domain can be modelled with far lesser number of Slepian basis coefficients than DFT basis coefficients.

Thus far, the UE deals and presented SRS where exponential complex sequence and ZC sequence was only across SRS subcarriers in any OFDM symbol and the same was repeated across SRS OFDM symbols. When the SRS subcarriers use complex exponential sequences both in time and frequency, the above-described embodiments may be applied to an OTFS transmitter and receiver as well.

FIG. 43 illustrates 2D pilots, according to an embodiment.

Referring to FIG. 43, the method assumes a rectangular region of pilots, which can be derived from any configuration (Scheme 1/Scheme 2/Scheme 3).

Let the rectangular time-frequency grid of pilots be M×N (M frequency values and N time symbols).

The method assumes $N_U$ UEs using the same time-frequency resource. The $i^{th}$ UE transmits pilots $S_i$ (ith UE pilot matrix) over the rectangular time-frequency grid as shown in Equation (9).

$$S_i = Z_i \odot R_i,\ R_i = f_{a,M} f_{b,N}^T$$

In Equation (9), $f_{a,M}$ is the $a^{th}$ column vector of an M×M IFFT matrix having an ith element that is given by $$e^{\frac{j2\pi a(i-1)}{M}},$$

where ⊙ is the Hadamard product or element-wise multiplication of matrices, and $Z_i$ is a 2D sequence in time- and frequency-domains and as a special case, can be the all-unity sequence. The method names $Z_i$ as the ith Z-user pilot matrix and $R_i$ as the ith R-user pilot matrix.

Throughout this disclosure, UEs can refers to ports and ports can mean UEs as well.

This arrangement of 2D pilots may also be applied to an OTFS transmitter as well.

2D Channel: The M×N 2D channel is given by Equation (10).

$$H_i = \sum_{m=0}^{M-1} \sum_{n=0}^{N-1} \phi_{m,n}^{(Mtd)} x_{m,n}^{(Mtd,i)} \tag{10}$$

In Equation (10), Ø is a 2D basis matrix and there are MN such matrices, and Mtd denotes the choice of basis (and henceforth will be dropped). Choice of basis can be Slepian, Polynomial, DCT, DFT, oversampled DFT, Karhunen-Loeve, etc., x are basis coefficients of ith user, associated with the corresponding basis matrix.

The ith UE channel matrix can be approximated as shown in Equation (11).

$$H_i = \sum_{m\in F} \sum_{n\in T} \phi_{m,n} x_{m,n}^{(i)} \tag{11}$$

In Equation (11), F and T are subsets of {0, . . . , M−1} and {0, . . . , N−1}, respectively.

Using the vectorization operation on the matrix, the ith channel vector can be determined using Equation (12).

$$h_i = vec(H_i) = \sum_{m\in F} \sum_{n\in T} \phi_{m,n} x_{m,n}^{(i)} \tag{12}$$

In Equation (12), the basis vector is $\emptyset_{m,n}=\text{vec}(\emptyset_{m,n})$. Define vectorized basis matrix $\tilde{\emptyset}=[\ldots \emptyset_{m,n} \ldots]$ and $$x^{(i)} = \begin{bmatrix} \vdots \\ x_{m,n}^{(i)} \\ \vdots \end{bmatrix},$$

where m∈F, n∈T. The total number of elements in F and T is R. The dimension of $\tilde{\emptyset}$ is MN×R. The received signal matrix over the rectangular time-frequency grid is shown in Equation (13).

$$Y = \sum_{i=1}^{N_U} H_i \odot S_i \tag{13}$$

Using the vectorization operation on the matrix, the method forms the received vector of values over the pilot subcarriers as shown in Equation (14).

$$y=\text{vec}(Y)=Ax_{all} \tag{14}$$

In Equation (14), A is an all-user vectorized basis matrix, $x_{all}$ is an all-user basis coefficient vector, and $\tilde{S}_i=\text{diag}(\text{vec}(Z_i)\odot\text{vec}(R_i))$ the digonalized and vectorised version of the ith UE pilot matrix. The diagonal matrix X with the column vector x along the main diagonal is denoted by X=diag(x). The dimension of A is $MN \times N_U R$. Here, $x^{(i)}$ is an ith user-basis coefficient vector and $x_{all}$ is an all-user basis coefficient vector as shown in Equation (15).

$$A = \left[\tilde{S}_1 \tilde{\phi} \ \ \ldots \ \ \tilde{S}_{N_U} \phi\right] \tag{15}$$

$$x_{all} = \begin{bmatrix} x^{(1)} \\ \vdots \\ x^{(N_U)} \end{bmatrix}$$

Define $\overline{Z}_i$ as a matrix whose each element is the inverse of the corresponding element of $Z_i$. $\overline{Z}_i$ will be named as the ith UE zbar pilot matrix.

If all UEs/ports have the same sequence $Z_i$, the method can denote it by Z and the corresponding matrix by $\overline{Z}$. In that case, define $\overline{A}=\text{diag}(\text{vec}(\overline{Z}))A$ and $\overline{y}=\text{diag}(\text{vec}(\overline{Z}))y$ Using the vectorization operation on the matrix, the method forms the received vector as $=\text{vec}(Y)=Ax_{all}$. Also, $\overline{y}=\overline{A}x_{all}$.

2D-Receiver

Here, $y=Ax_{all}$.

Estimate $x_{all}$ as $\hat{x}_{all}=(A^H A)^{-1} A^H y$.

If the Z-user pilot matrix is same for all UEs, then $\overline{y}=\overline{A}x_{all}$ and $\hat{x}_{all}=(\overline{A}^H\overline{A})^{-1}\overline{A}^H y$. From $\hat{x}_{all}$, $x^{(i)}$ is extracted and an estimate of $h_i$ as $$h_i = vec(H_i) = \sum\nolimits_{m \in F} \sum\nolimits_{n \in T} \tilde{\phi}_{m,n} x_{m,n}^{(i)}$$

may be obtained.

Complexity a) Consider 12 SRS subcarriers in frequency and 12 SRS OFDM symbols in a slot. A total of 16 UEs. Four CS in time domain and four CS in frequency domain. Assume $Z_i$ is same for all UEs/ports.

b) Case 1: CS=0,3,6,9 in both time and frequency domains.

$$R_i = f_{a,12} f_{b,12}^T$$

for all 16 UEs such that a, b∈{0,3,6,9} c) Case 2: CS=1,4,7,10 in both time and frequency domains.

$$R_i = f_{a,12} f_{b,12}^T$$

for all 16 UEs such that a, b∈{1,4,7,10} d) Let $A_{case1}$ and $A_{case2}$ be the A matrices for Case 1 and Case 2 above.

e) The method can see that $$\left(A_{case\,1}^H A_{case\,1}\right)^{-1} \text{ and } \left(A_{case\,2}^H A_{case\,2}\right)^{-1}$$

are the same and can be pre-computed and stored, and furthermore not dependent on Z.

f) $A_{case2}=DA_{case1}$, where D is a diagonal matrix with $$vec\left(f_{1,12} f_{1,12}^T\right)$$

along the diagonal.

g) $A_{case1}$ can be precomputed and D can be computed easily.

h) Accordingly, a new algorithm can be easily implemented. Similar analysis holds for $\overline{A}$. The basis matrix Ø can be from any basis like Slepian, polynomial, DFT, oversampled DFT, DCT, Karhunen-Loeve or any other basis.

Timing and Frequency Offset Compensation

If there is a timing offset τ (this can be different for different UEs, but the same for all ports), If UEs are involved, the UE uses one value, either the maximum or a value in the middle for all possible UEs). The kth RE (resource element) will undergo a phase change due this which is $e^{-j2\pi k \Delta f \tau}$, where Δf is the subcarrier spacing. A compensating timing offset vector $t_{TO}$ is constructed as shown in Equation (16).

$$t_{TO} = \begin{bmatrix} 1 \\ e^{j2\pi K_{TC} \Delta f \tau} \\ \vdots \\ e^{j2\pi K_{TC}(N-1)\Delta f \tau} \end{bmatrix}. \tag{16}$$

If there is a frequency offset $f_o$ (in Hz) (this can be different for different UEs, but same for all ports), if UEs are involved, the UE uses one value, either the maximum or a value in the middle for all possible UEs). All REs in the nth OFDM symbol will undergo a phase change due this, which is $e^{j2\pi n f_o T}$, where T is the OFDM symbol duration in seconds including the CP. A compensating frequency offset vector $f_{FO}$ is constructed as shown in Equation (17).

$$f_{FO} = \begin{bmatrix} 1 \\ e^{-j2\pi n f_o T} \\ \vdots \\ e^{j-2\pi(N-1) f_o T} \end{bmatrix} \tag{17}$$

The received signal vector Y is pre-compensated as $Y=\text{diag}(t_{TO})Y\text{diag}(f_{FO})$ as a first step before further processing in the 2D-SRS or OTFS receiver.

CSs and Exponential Complex Sequences

The ith R-user pilot matrix is given as $$R_i = f_{a,M} f_{b,N}^T.$$

Here, $f_{a,M}$, $f_{b,N}$ are the exponential complex sequences in frequency and time-domains, respectively, with CSs a and b, respectively. Let the channel in frequency $H_i(:, a)$ for any a (time) and i (user) have a perceived bandwidth of $\overline{\epsilon}_f$ and bandlimited between $g_f+\overline{\epsilon}_f$ and $g_f-\overline{\epsilon}_f$. Likewise, let the channel in time $H_i(b, :)$ for any b (frequency) and i (user) have a perceived bandwidth of $\overline{\epsilon}_t$ and bandlimited between $g_t+\overline{\epsilon}_t$ and $g_t-\overline{\epsilon}_t$.

Furthermore let $$m_g = \begin{bmatrix} 1 \\ e^{-j2\pi g} \\ \vdots \\ e^{-j2\pi g(M-1)} \end{bmatrix}$$

when discussed in the context of frequency domain as there are M pilots per OFDM symbol in frequency domain and $$m_g = \begin{bmatrix} 1 \\ e^{-j2\pi g} \\ \vdots \\ e^{-j2\pi g(N-1)} \end{bmatrix}$$

in the context of time domain as there are N pilots per subcarrier in time domain. Here $m_g$ is called as the mg-vector and g is the index of the mg-vector.

CSs and Frequency Offset Compensation.

For frequency offset compensation and exponential complex sequence in time domain:

a) $f_{FO}=m_{gt}$ and CSs such that the exponential complex sequence in time domain of all UEs be $m_0$, $m_{-2\bar{\epsilon}_t}$, $m_{-4\bar{\epsilon}_t}$, etc.

b) No frequency offset compensation and CSs such that the exponential complex sequence of all UEs in time domain be $m_0$, $m_{-2\bar{\epsilon}_t}$, $m_{-4\bar{\epsilon}_t}$, etc.

c) No frequency offset compensation and CSs such that the exponential complex sequence of all UEs in time domain be $m_{a+0}$, $m_{a-2\bar{\epsilon}_t}$, $m_{a-4\bar{\epsilon}_t}$, etc. Here, a can be an integer or a fraction or integer and fraction. For fractions, it is extracted from columns of an oversampled DFT matrix.

d) In one embodiment, $\bar{\epsilon}_t$ in a)-c) above can be the smallest integer greater than or equal half the perceived bandwidth of the channel in time domain.

CSs and timing offset compensation: For timing offset compensation and exponential complex sequence in frequency domain:

a) $t_{TO}=m_{g\,f}$ and CSs such that the exponential complex sequence of all UEs in frequency domain be $m_0$, $m_{-2\bar{\epsilon}_f}$, $m_{-4\bar{\epsilon}_f}$, etc.

b) No timing offset compensation and CSs such that the exponential complex sequence of all UEs in frequency domain be $m_0$, $m_{-2\bar{\epsilon}_f}$, $m_{-4\bar{\epsilon}_f}$, etc.

c) No timing offset compensation and CSs such that the exponential complex sequence of all UEs in frequency domain be $m_{a+0}$, $m_{a-2\bar{\epsilon}_f}$, $m_{a-4\bar{\epsilon}_f}$, etc. Here, a can be an integer or a fraction or integer and fraction. For fractions, it is extracted from columns of an oversampled DFT matrix.

d) In one embodiment, $\bar{\epsilon}_f$ in a)-c) above can be the smallest integer greater than or equal half the perceived bandwidth of the channel in frequency domain.

The method can be used to extend to any Rx of any channel, not just SRS receivers. The method can be used for a PDSCH receiver/(PUSCH receiver as well.

FIG. 44 illustrates a BS according to an embodiment.

Referring to FIG. 44, the BS includes a transceiver 4410, a memory 4420, and a processor 4430. The transceiver 4410, the memory 4420, and the processor 4430 of the BS may operate according to a communication method of the BS described above. However, the components of the BS are not limited thereto. For example, the BS may include more or fewer components than those described above. In addition, the processor 4430, the transceiver 4410, and the memory 4420 may be implemented as a single chip. The processor 4430 may include at least one processor.

The transceiver 4410 collectively refers to a receiver and a transmitter, and may transmit/receive a signal to/from a terminal (or UE) or a network entity. The signal transmitted or received to or from the terminal or a network entity may include control information and data. The transceiver 4410 may include a radio frequency (RF) transmitter for up-converting and amplifying a frequency of a transmitted signal, and an RF receiver for amplifying low-noise and down-converting a frequency of a received signal. However, this is only an example of the transceiver 4410 and components of the transceiver 4410 are not limited to the RF transmitter and the RF receiver.

The transceiver 4410 may receive and output, to the processor 4430, a signal through a wireless channel, and transmit a signal output from the processor 4430 through the wireless channel.

The memory 4420 may store a program and data required for operations of the BS. The memory 4420 may store control information or data included in a signal obtained by the BS. The memory 4420 may be a storage medium, such as ROM, RAM, a hard disk, a CD-ROM, and a DVD, or a combination of storage media.

The processor 4430 may control a series of processes such that the BS operates as described above. For example, the transceiver 4410 may receive a data signal including a control signal transmitted by the terminal, and the processor 4430 may determine a result of receiving the control signal and the data signal transmitted by the terminal.

FIG. 45 illustrates a UE according to an embodiment.

Referring to FIG. 45, the UE includes a transceiver 4510, a memory 4520, and a processor 4530. The transceiver 4510, the memory 4520, and the processor 4530 of the UE may operate according to a communication method of the UE described above. However, the components of the UE are not limited thereto. For example, the UE may include more or fewer components than those described above. In addition, the processor 4530, the transceiver 4510, and the memory 4520 may be implemented as a single chip. The processor 4530 may include at least one processor.

The transceiver 4510 collectively refers to a receiver and a transmitter, and may transmit/receive a signal to/from a BS or a network entity. The signal transmitted or received to or from the BS or a network entity may include control information and data. The transceiver 4510 may include an RF transmitter for up-converting and amplifying a frequency of a transmitted signal, and an RF receiver for amplifying low-noise and down-converting a frequency of a received signal. However, this is only an example of the transceiver 4510 and components of the transceiver 4510 are not limited to the RF transmitter and the RF receiver.

The transceiver 4510 may receive and output, to the processor 4530, a signal through a wireless channel, and transmit a signal output from the processor 4530 through the wireless channel.

The memory 4520 may store a program and data required for operations of the UE. The memory 4520 may store control information or data included in a signal obtained by the UE. The memory 4520 may be a storage medium, such as ROM, RAM, a hard disk, a CD-ROM, and a DVD, or a combination of storage media.

The processor 4530 may control a series of processes such that the UE operates as described above. For example, the transceiver 4510 may receive a data signal including a control signal transmitted by the BS or the network entity, and the processor 4530 may determine a result of receiving the control signal and the data signal transmitted by the BS or the network entity.

Those skilled in the art will understand that the various illustrative logical blocks, modules, circuits, and steps described in this application may be implemented as hardware, software, or a combination of both. To clearly illustrate this interchangeability between hardware and software, various illustrative components, blocks, modules, circuits, and steps are generally described above in the form of their functional sets. Whether such function sets are implemented as hardware or software depends on the specific application and the design constraints imposed on the overall system. Technicians may implement the described functional sets in different ways for each specific application, but such design decisions should not be interpreted as causing a departure from the scope of this application.

In the above-described embodiments of the disclosure, all operations and messages may be selectively performed or may be omitted. In addition, the operations in each embodiment do not need to be performed sequentially, and the order of operations may vary. Messages do not need to be transmitted in order, and the transmission order of messages may change. Each operation and transfer of each message can be performed independently.

Although the figures illustrate different examples of UE, various changes may be made to the figures. For example, the UE can include any number of each component in any suitable arrangement. In general, the figures do not limit the scope of this disclosure to any particular configuration(s). Moreover, while figures illustrate operational environments in which various UE features disclosed in this patent document can be used, these features can be used in any other suitable system.

The various illustrative logic blocks, modules, and circuits described in this application may be implemented or performed by a general purpose processor, a digital signal processor (DSP), an application specific integrated circuit (ASIC), a field programmable gate array (FPGA) or other programmable logic devices, discrete gates or transistor logics, discrete hardware components, or any combination thereof designed to perform the functions described herein. The general purpose processor may be a microprocessor, but in an alternative, the processor may be any conventional processor, controller, microcontroller, or state machine. The processor may also be implemented as a combination of computing devices, such as a combination of a DSP and a microprocessor, a plurality of microprocessors, one or more microprocessors cooperating with a DSP core, or any other such configuration.

The steps of the method or algorithm described in this application may be embodied directly in hardware, in a software module executed by a processor, or in a combination thereof. The software module may reside in RAM memory, flash memory, ROM memory, EPROM memory, EEPROM memory, register, hard disk, removable disk, or any other form of storage medium known in the art. A storage medium is coupled to a processor to enable the processor to read and write information from/to the storage media. In an alternative, the storage medium may be integrated into the processor. The processor and the storage medium may reside in an ASIC. The ASIC may reside in a terminal. In an alternative, the processor and the storage medium may reside in the terminal as discrete components.

In one or more designs, the functions may be implemented in hardware, software, firmware, or any combination thereof. If implemented in software, each function may be stored as one or more pieces of instructions or codes on a computer-readable medium or delivered through it. The computer-readable medium includes both a computer storage medium and a communication medium, the latter including any medium that facilitates the transfer of computer programs from one place to another. The storage medium may be any available medium that can be accessed by a general purpose or special purpose computer.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a base station (BS) in a wireless communication system, the method comprising:

transmitting, to a user equipment (UE), a radio resource control (RRC) message including configuration information on a sounding reference signal (SRS) resource, wherein the configuration information includes information on a comb offset hopping and information on a cyclic shift hopping; and receiving, from the UE, an SRS based on the configuration information on the SRS resource, wherein the comb offset hopping and the acyclic shift hopping are applied to the SRS based on the configuration information, wherein cyclic shifts of antenna ports for orthogonal frequency-division multiplexing (OFDM) symbols include at least one first subset, and wherein the cyclic shift hopping is based on a first hopping identity (ID) and the comb hopping is based on a second hopping ID.

2. The method of claim 1, wherein combs of the antenna ports for the OFDM symbols include at least one second subset.

3. A method performed by a user equipment (UE) in a wireless communication system, the method comprising:

receiving, from a base station (BS), a radio resource control (RRC) message including configuration information on a sounding reference signal (SRS) resource, wherein the configuration information includes information on a comb offset hopping and information on a cyclic shift hopping; and transmitting, to the BS, an SRS based on the configuration information on the SRS resource, wherein the comb offset hopping and the cyclic shift hopping are applied to the SRS based on the configuration information, wherein cyclic shifts of antenna ports for orthogonal frequency-division multiplexing (OFDM) symbols include at least one first subset, and wherein the cyclic shift hopping is based on a first hopping identity (ID) and the comb hopping is based on a second hopping ID.

4. The method of claim 3, wherein combs of the antenna ports for the OFDM symbols include at least one second subset.

5. A base station (BS), comprising:

at least one transceiver;

at least one processor communicatively coupled to the at least one transceiver; and at least one memory, communicatively coupled to the at least one processor, storing instructions executable by the at least one processor individually or in any combination to cause the BS to:

transmit, to a user equipment (UE), a radio resource control (RRC) message including configuration information on a sounding reference signal (SRS) resource, wherein the configuration information includes information on a comb offset hopping and information on a cyclic shift hopping, and receive, from the UE, an SRS based on the configuration information on the SRS resource, wherein the comb offset hopping and the cyclic shift hopping are applied to the SRS based on the configuration information, wherein cyclic shifts of antenna ports for orthogonal frequency-division multiplexing (OFDM) symbols include at least one first subset, and wherein the cyclic shift hopping is based on a first hopping identity (ID) and the comb hopping is based on a second hopping ID.

6. The BS of claim 5, wherein combs of the antenna ports for the OFDM symbols include at least one second subset.

7. A user equipment (UE), comprising:

at least one transceiver;

at least one processor communicatively coupled to the at least one transceiver; and at least one memory, communicatively coupled to the at least one processor, storing instructions executable by the at least one processor individually or in any combination to cause the UE to:

receive, from a base station (BS), a radio resource control (RRC) message including configuration information on a sounding reference signal (SRS) resource, wherein the configuration information includes information on a comb offset hopping and information on a cyclic shift hopping, and transmit, to the BS, an SRS based on the configuration information on the SRS resource, wherein the comb offset hopping and the acyclic shift hopping are applied to the SRS based on the configuration information, and wherein cyclic shifts of antenna ports for orthogonal frequency-division multiplexing (OFDM) symbols include at least one first subset, and wherein the cyclic shift hopping is based on a first hopping identity (ID) and the comb hopping is based on a second hopping ID.

8. The UE of claim 7, wherein combs of the antenna ports for the OFDM symbols include at least one second subset.

* * * * *